United States Patent
Trivedi et al.

(10) Patent No.: US 12,363,011 B2
(45) Date of Patent: Jul. 15, 2025

(54) CENTRALIZED KEY PERFORMANCE INDICATOR MONITORING AND DATA STORAGE APPARATUS AND METHOD

(71) Applicant: Rakuten Mobile, Inc., Tokyo (JP)

(72) Inventors: Vishvesh Trivedi, Tokyo (JP); Anshul Bhatt, Tokyo (JP); Dhananjay Chaubey, Tokyo (JP); Alok Singh Pawar, Madhya Pradesh (IN); Manish Patidar, Madhya Pradesh (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/757,300

(22) PCT Filed: Mar. 16, 2022

(86) PCT No.: PCT/US2022/020490
§ 371 (c)(1),
(2) Date: Jun. 14, 2022

(87) PCT Pub. No.: WO2023/177395
PCT Pub. Date: Sep. 21, 2023

(65) Prior Publication Data
US 2024/0305547 A1  Sep. 12, 2024

(51) Int. Cl.
*H04L 43/045* (2022.01)
*G06F 3/04847* (2022.01)
(Continued)

(52) U.S. Cl.
CPC ........ *H04L 43/045* (2013.01); *G06F 3/04847* (2013.01); *H04L 41/20* (2013.01); *H04L 41/22* (2013.01); *H04L 41/5009* (2013.01)

(58) Field of Classification Search
CPC ....... H04L 43/045; H04L 41/20; H04L 41/22; H04L 41/5009; H04L 43/02; H04L 43/55;
(Continued)

(56) References Cited

U.S. PATENT DOCUMENTS

| | | | |
|---|---|---|---|
| 2010/0229096 A1 | 9/2010 | Maiocco et al. | |
| 2018/0132117 A1* | 5/2018 | Senarath | G06F 11/3006 |
| 2020/0236006 A1* | 7/2020 | Asba | H04L 41/5009 |

* cited by examiner

*Primary Examiner* — Nicholas Ulrich
(74) *Attorney, Agent, or Firm* — HAUPTMAN HAM, LLP

(57) ABSTRACT

An apparatus configured to process raw data received from a network service provider monitoring system to determine one or more pieces of information included in the raw data are relevant to performance monitoring of a communication network based on a matching with one or more recognized data categories for classifying pieces of information that are relevant to performance monitoring of the communication network, and to determine whether any pieces of the information included in the raw data are irrelevant to performance monitoring based on a failure to match any of the recognized data categories. The apparatus is also configured to extract the one or more pieces of information included in the raw data determined to be relevant to performance monitoring of the communication network from the raw data, and store the one or more pieces of information relevant to performance monitoring of the communication network in a central data repository.

20 Claims, 11 Drawing Sheets

(51) Int. Cl.
*H04L 41/00* (2022.01)
*H04L 41/22* (2022.01)
*H04L 41/5009* (2022.01)

(58) Field of Classification Search
CPC .............. H04L 41/064; H04L 43/0817; H04L 41/0213; G06F 3/04847; H04W 16/00
See application file for complete search history.

FIG. 2

KPI Repository — 200

Create Specific KPI?
or
Create Generic KPI?

| Comp Type | KPI Name | Domain | Network Service Provider | Node | Technology | KPI Group | Status | Created Date |
|---|---|---|---|---|---|---|---|---|
| Reg | KPI B | Domain A | Vendor A | Node A | Technology A | Group A | In Process | DD-MM-YYYY |
| Reg | KPI B | Domain B | Vendor B | Node B | Technology B | Group A | In Process | DD-MM-YYYY |
| Reg | KPI C | Domain B | Vendor B | Node B | Technology B | Group A | Scheduled | DD-MM-YYYY |
| Reg | KPI D | Domain B | Vendor B | Node B | Technology B | Group A | Scheduled | DD-MM-YYYY |
| Reg | KPI E | Domain B | Vendor B | Node C | Technology B | Group A | Available | DD-MM-YYYY |

FIG. 3

KPI Configuration Interface 300

| KPI Name Input Field 301a | Computation Type Input Field 301b | Domain Input Field 301c | Node Input Field 301d |
| Network Service Provider Input Field 301e | Technology Input Field 301f | Software Version Input Field 301g | Counter Category Input Field 301h |
| Type Input Field 301j | Sub-Category Input Field 301i | Sub-Category Input Field 301k | Sub-Category Input Field 301m |
| Sub-Category Input Field 301n | Unit Input Field 301o | KPI Group Input Field 301p | Interface Name Input Field 301q |

Description Input Field 301r

Historical Data Date Range Input Field 301s

Next

Cancel

FIG. 7

Add Generic KPI 700

- KPI Name Input Field 601a
- Domain Input Field 601b
- Technology Input Field 601c
- KPI Unit Input Field 601d
- KPI Group Input Field 601e
- Description Input Field 601f ○ Aggregation  ● Formula

Formula List
- Search Formulas
- Formula A
- Formula B

Add Function

Validate Formula

Formula Creation Workspace

MIN(Formula A; Formula B)

Save

Cancel

FIG. 8

Generic KPI Repository

Create Generic KPI ▷

| Comp Type | KPI Name | Domain | Network Service Provider | Node | Technology | KPI Group | Status | Created Date |
|---|---|---|---|---|---|---|---|---|
| Reg | KPI B | Domain A | Vendor A | Node A | Technology A | Group A | In Process | DD-MM-YYYY |
| Reg | KPI B | Domain B | Vendor B | Node B | Technology B | Group A | In Process | DD-MM-YYYY |
| Reg | KPI C | Domain B | Vendor B | Node B | Technology B | Group A | Scheduled | DD-MM-YYYY |
| Reg | KPI D | Domain B | Vendor B | Node B | Technology B | Group A | Scheduled | DD-MM-YYYY |
| Reg | KPI E | Domain B | Vendor B | Node C | Technology B | Group A | Available | DD-MM-YYYY |

Map KPI List

| Search KPIs |
| KPI A |
| KPI B |
| KPI C |
| KPI C |
| KPI D |
| KPI E |

900

KPI Mapping Workspace

| | KPI Name | Domain | Network Service Provider | Technology | Node | Type |
|---|---|---|---|---|---|---|
| ☐ | KPI A | Domain A | Vendor A | Technology A | Node A | Select Type |
| ☐ | KPI B | Domain A | Vendor A | Technology B | Node B | Select Type |

Save

Cancel

CENTRALIZED KEY PERFORMANCE INDICATOR MONITORING AND DATA STORAGE APPARATUS AND METHOD

RELATED APPLICATIONS

The present application is a National Phase of International Application No. PCT/US2022/020490 filed Mar. 16, 2022.

BACKGROUND

Network operators, network service providers and device manufacturers (e.g., wireless, cellular, etc.) are continually challenged to deliver value and convenience to consumers by, for example, providing compelling communication networks and network services that are dependable and capable of being flexibly constructed, scalable, diverse, and economically operated. To provide such communication networks and network services, network operators, network service providers and device manufacturers often track key performance indicators (KPIs) that are indicative of an operating state of a communication network and/or various network services and/or network devices.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 is a diagram of a graphical user interface, in accordance with one or more embodiments.

FIG. 3 is a diagram of a graphical user interface, in accordance with one or more embodiments.

FIG. 7 is a diagram of a graphical user interface, in accordance with one or more embodiments.

FIG. 8 is a diagram of a graphical user interface, in accordance with one or more embodiments.

FIG. 9 is a diagram of a graphical user interface, in accordance with one or more embodiments.

DETAILED DESCRIPTION

Figure 1:
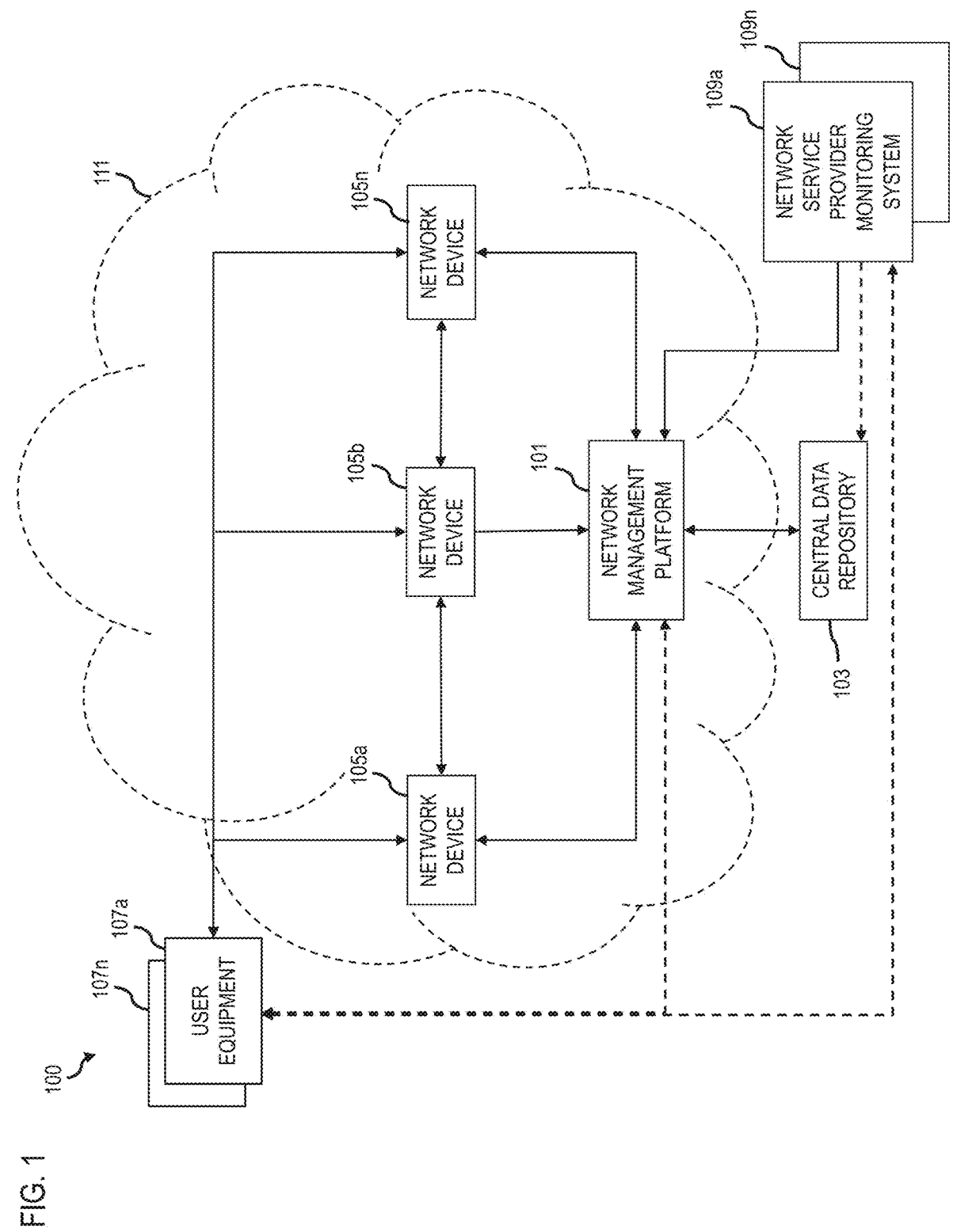
FIG. 1 is a diagram of a KPI monitoring and centralized data storage system, in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows may include embodiments in which the first and second features are formed or positioned in direct contact, and may also include embodiments in which additional features may be formed or positioned between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of an apparatus or object in use or operation in addition to the orientation depicted in the figures. The apparatus may be otherwise oriented (rotated 90 degrees or at other orientations) and the spatially relative descriptors used herein may likewise be interpreted accordingly.

Communication networks and network services are often provided by static or inflexible systems that are difficult to configure, scale, and deploy over various target areas. Dependable provision of communication networks and/or network services that are capable of being flexibly constructed, scalable and diverse is often reliant on the collection, analysis and reporting of information regarding multiple network functions, network services, network devices, etc. that affect the performance, accessibility, configuration, scale, and/or deployment of a communication network, various network functions, network services, and the like.

Network service providers often deploy network monitoring systems that track various key performance indicators (KPIs) of an aspect of a network for determining how well that aspect and/or the network is performing. KPIs are often KPI values and/or trends that are compared to certain thresholds to indicate the relative performance of a communication network, network service, network device, etc. The KPI values are often based on monitoring data referred to herein as system data.

Sometimes, when a KPI value for a certain network function, network service or feature is below a preset threshold, the KPI value may imply that the network is operating normally, whereas when the KPI value is above or equal to the preset threshold, the KPI value implies that the network is operating below expectation, which in turn may indicate that some unexpected event (e.g., a hardware failure, capacity overload, a cyberattack, etc.) has occurred. Accordingly, a series of actions can be carried out by the network monitoring system such as alerting the network operator, shifting a network function from a problematic server to a healthy server, temporarily shutting down the network, or some other suitable action. Of course, depending on the network configuration, a condition in which the KPI value is higher than or equal to a threshold can also indicate that the network is operating normally, while a condition in which the KPI value is below the threshold indicates that the network is operating below expectation. Several other types of threshold configurations are possible as the threshold configurations may vary depending on the needs of a specific user or specific network operator, depending on individual preference, type of KPI being monitored, type of KPI created by a user for monitoring, type of system data that is processed for monitoring a KPI, and the like.

Network operators that coordinate and deploy communication networks which involve network services (e.g., hardware, software, etc.) provided by one or more network service providers are reliant on system data supplied to the network operator by the one or more network service providers for monitoring KPIs. Such communication networks may involve one or more network services across multiple domains such as radio area network (RAN), base station subsystem (BSS), platform, core network, etc., various technologies (such as 3G, 4G, LTE, 5G, etc.), multiple locations, various software interfaces, multiple devices, etc. that are proprietary and/or optimized by a specific network service provider.

Each network service provider often uses a corresponding monitoring system to monitor performance of the network service(s) provided by that network service provider to gather various system data usable by the network operator for determining KPI values indicative of the state of the communication network. The network service providers send the system data to the network operator for monitoring the status of the communication network in consideration of the system data associated with the network service(s) provided by each network service provider. For example, the network operator uses the system data supplied by the network service providers to generate KPI value(s) and/or to evaluate the quality of services provided by each of the network service providers.

Prior to sending the system data, the network service providers and the network operators often agree regarding how, when, and in what format each network service provider's monitoring system will send the system data to the network operator, and how frequently the system data will be sent.

The system data is typically sent by the network service providers to the network operator in some pre-processed format that is meaningful for the network service provider monitoring its own proprietary and/or optimized system and/or service across one or more domains, technologies, software interfaces, devices, etc. Upon receipt, the network operator typically reviews the system data in whatever form the system data was received from the network service provider, which can be a disjointed and cumbersome process on the network operator side, as one or more users will then review the system data in various formats and attempt to discern what the system data means across the vast amounts of system data received from numerous network service providers. Moreover, different users may monitor different services from different network service providers in different formats, which makes it difficult to monitor multiple KPIs simultaneously and/or comprehend any relationship between the KPIs associated with the services provided by different network service providers.

For example, one user may monitor a KPI for network availability for element A associated with a network service provided by network service provider A and element B associated with a network service provided by network service provider B. However, the presentation formatting and information of the system data provided to the user may be different, since network service provider A and network service provider B may have processed the system data in different manners. Such discrepancies make it difficult to simultaneously monitor the KPIs based on the system data provided by network service provider A and network service provider B. Sometimes, the network service providers don't even provide system data that is other than a fully processed KPI that is established by the network service provider and is difficult for a user to use for anything other than what the network service provider is attempting to indicate based on the KPI sent to the network operator. Although it may be possible for a user to request that network service provider A and network service provider B revise the system data or provide some background data that is used to generate a fully processed KPI on the network service provider side, the request/revision process will be time-consuming. For example, a user usually needs to create a ticket for the request, wait for approval of the request, send the request to network service provider A and network service provider B, and wait for network service provider A and network service provider B to re-process and re-send the KPI data, etc. Such a long, multi-actor, process is too slow for enabling a user at the network operator side to address issues associated with the communication network that require immediate attention.

As the communication network evolves and improves, a single communication network may involve an ever-changing quantity of network service providers for providing network services and/or that are associated with providing network services associated with various aspects of the communication network (e.g., domains, technologies, locations of services, etc.) and, as a result, the state of the communication network may vary dynamically with the addition and/or subtraction of network service providers, a change in one or more network services, etc. Furthermore, as the communication network evolves and improves, and various changes to the communication network such as changing network service providers and/or network services, etc. occur, monitoring the status of different aspects of the communication network becomes a complex undertaking that involves a growing number of users and/or change-over of users over time. In other words, because the communication network may involve an ever-changing quantity of different network service providers, which may have different ways of processing and presenting the system data and/or KPIs, and because an ever-changing monitoring user base is charged with monitoring the status of the communication network, the opportunity for discrepancies between the style and information contained in the system data, and the interpretation thereof, increases. As such, the traditional approach of monitoring KPIs based on pre-processed system data and/or fully processed KPIs received from network service providers is neither efficient nor effective.

Additionally, the traditional approach of monitoring pre-processed system data and/or fully processed KPIs received from a network service provider makes it difficult for a user to create or modify the system data in the user's preferred manner for generating KPIs that are meaningful to the user. In order to change, add, create, or modify the pre-processed system data and/or fully processed KPIs in conventional network monitoring systems, the user goes through a time-consuming process such as that discussed above (e.g., the user creates a request ticket, waits for approval of the request from the network operator, waits for the network operator to send the request to network service provider A and network service provider B if the network operator approves the request, waits for network service provider A and network service provider B to re-process and re-send the system data to the network operator, waits for the network operator to re-send the re-processed system data to the user, etc.). This time-consuming approach is not suitable for complex communication networks that involve an ever increasing/changing user base tasked with monitoring the status of various KPIs regarding a communication network provided by orchestrating various network services that are provided by an evolving/changing of participating network service providers that may, themselves, evolve and/or change the provision of their own network services and/or the formatting and/or presentation of system data or fully processed KPIs that are being supplied to the network operator.

Simply put, if a user A wants to monitor KPI A in manner A, and user B wants to monitor the same KPI A in manner B, it is very burdensome for the network operator to handle the request. It is also burdensome for the network service provider to process the KPI data in multiple ways.

Network operators consistently check KPIs, for example, to ensure validity and stability of the communication network. Then, based on a determination that an anomaly occurs in one or more KPIs, take an appropriate action such as making a change in network service providers or network devices that are used to provide one or more network services that are malfunctioning to one or more alternative network service providers and/or one or more alternative network devices to ensure the communication network is operating and available for consumers. Similarly, predicting anomalies in the KPIs is useful for pre-empting a potential issue in the operation of the communication network. Thus, ensuring that the system data is easily updated by network service providers, and capable of being readily formatted by users at the network operator for timely, consistent, and accurate monitoring of KPIs is increasingly valuable to the network service providers and/or the network operator.

FIG. 1 is a diagram of a KPI monitoring and centralized data storage system 100, in accordance with one or more embodiments.

System 100 provides a centralized system which allows multiple network service providers to provide system data to a network operator such that multiple users are able to monitor one or more KPIs in their own preferred manner. In some embodiments, system 100 makes it possible for users to easily specify user-specific requirements for how the system data should be processed for generating one or more KPIs indicative of how one or more aspects of the communication network being monitored is operating, which allows for the system data to be processed and comprehended in an efficient manner.

Additionally, system 100 makes it possible for a network service provider to directly send the system data to the network operator while reducing the need for one or more individuals and/or member(s) of specific team(s) at the network operator to be involved in such sending/receiving/sorting/storing procedures. System 100 also provides improved transparency into what system data is stored and available for monitoring KPIs associated with the communication network provided by the network operator. Furthermore, the system 100 makes it possible for network operators and/or network service providers to access and view the system data in a central data repository provided by the network operators, and/or as categorized and sorted for storage in the central data repository for easy recognition and monitoring by the network operator and/or the network service providers.

System 100 comprises a network management platform 101, a central data repository 103, one or more network devices 105a-105n (collectively referred to as network devices 105), and one or more user equipment (UE) 107a-107n (collectively referred to as UE 107). The network management platform 101, the central data repository 103, the one or more network devices 105, and/or the one or more user equipment (UE) 107 are communicatively coupled by way of a communication network 111. In some embodiments, the communication network 111 is orchestrated by the network management platform 101 which combines a plurality of network services provided by a network service provider via the network devices 105. In some embodiments, the network management platform 101 is a network orchestrator that implements the communication network 111. In some embodiments, the network management platform 101 is a portion of a network orchestrator that implements the communication network 111.

The network service providers associated with the network services provided have corresponding network service provider monitoring systems 109a-109n (collectively referred to as network service provider monitoring system 109). The network service provider monitoring systems 109 collect system data associated with the network services provided to communication network 111 and send that system data to the network management platform 101 to facilitate monitoring of the state of the communication network 111. In some embodiments, one or more of the network service monitoring systems 109 are communicatively coupled to the central data repository 103 without the network management platform 101 intervening. In some embodiments, the system data provided by the network monitoring systems 109 is sent to the network management platform 101 and/or the central data repository 103 as raw data. In some embodiments, raw data refers to a bundle of information that includes, for example, KPI values, statistics, data usage, timing of operations, identification information, IP addresses, domain, technology, software version, network service provider information, network equipment information, node names, or other suitable information that is collected by the network service provider monitoring systems 109 and is sent to the network management platform 101 and/or the central data repository 103, but is unformatted in a way that is immediately meaningful to a user at the network operator charged with monitoring one or more KPIs. The raw data includes pieces of information that are capable of being identified within the bundle of information by the network monitoring platform 101, and that are capable of being used/manipulated/stored in the central data repository 103 for being used in a user-specified manner for monitoring one or more KPIs. In some embodiments, raw data refers to somewhat pre-processed system data and/or KPIs that are supplied by one or more of the network provider monitoring systems 109 that includes pieces of information within the pre-processed system data and/or KPIs that are supplied by one or more of the network provider monitoring systems 109, that are capable of being identified by the network management platform 101, and that are capable of being used/manipulated/stored in the central data repository 103 for being used in a user-specified manner for monitoring one or more KPIs.

In some embodiments, network management platform 101 comprises a set of computer readable instructions that, when executed by a processor such as a processor 1103 (FIG. 11), causes network management platform 101 to perform the processes discussed in accordance with one or more embodiments. In some embodiments, network management platform 101 is remote from the network devices 105. In some embodiments, network management platform 101 is a part of one or more of the network devices 105. In some embodiments, one or more processes the network management platform 101 is configured to perform is divided among one or more of the network devices 105 and a processor remote from the network devices 105. In some embodiments, the network management platform 101 is at least partially implemented by a UE 107.

In some embodiments, central data repository 103 has searchable information stored therein that includes stored system data, rules defining various KPIs, network functions capable of being implemented in the network involving one or more of network usage, timing, connected devices, location, network resource consumption, cost data, example network KPIs, KPI monitoring profiles corresponding to one or more users, rules for determining validity of various calculations, other suitable elements or information, or a combination thereof. Central data repository 103 is a memory such as a memory 1105 (FIG. 11) capable of being queried or caused to store data in accordance with one or more embodiments. In some embodiments, the network management platform 101 and the central data repository 103 together form a network orchestrator that implements the communication network 111.

In some embodiments, network management platform 101 generates a graphical user interface that is output to a display by way of a UE 107 or a terminal associated with network management platform 101 for a user (e.g., a network operator, a network administrator, and any personnel which would like to or is responsible to monitor the state of the communication network 111), so as to allow the user to monitor the operating state of the communication network 111. In some embodiments, the user interface is accessible via a web browser such as by way of a website or a web browser plug-in.

The network service provider monitoring system(s) 109 of each of the plurality of network service providers continuously monitor their own corresponding network services and periodically send at predetermined times (e.g., every 5 minutes, every 15 minutes, every 30 minutes, etc.) the monitored system data to the network management platform 101. In some embodiments, the network management platform 101 causes the monitored system data to be stored in the central data repository 103. In some embodiments, as discussed above, the monitored system data is sent directly to the central data repository 103. In some embodiments, the central data repository 103 is controlled by the network operator. In some embodiments, the network management platform 101 checks the central data repository 103 for newly received system data and/or retrieves system data stored in the central data repository for illustration and/or evaluation as-needed for continuous, periodic, or on-demand monitoring. In some embodiments, the network management platform 101 is configured to retrieve the system data directly from the one or more network monitoring systems 109 without the network monitoring system(s) initiating the sending of the system data. In some embodiments, one or more of the network management platform 101 or the network monitoring system(s) 109 are configured to retrieve, request sending, and/or send user-specified pieces of information included in the system data available from a network monitoring system. In some embodiments, the network management platform 101 is configured to periodically request or retrieve the system data and/or specified pieces of system data according to a preset schedule (e.g., every 5 minutes, every 15 minutes, every 30 minutes, etc.) or on-demand for illustration and/or evaluation as-needed for continuous, periodic, or on-demand monitoring.

The system data is communicated from the network service provider monitoring systems 109 to the network management platform 101 and/or the central data repository 103 via one or more of a wireless communication channel, a wired communication channel, enhanced messaging service (EMS), email messaging, data packet transmission, or some other suitable type of data transmission which is optionally the same or different among the plurality of network service providers.

The network management platform 101 receives system data from the network service provider monitoring system(s) 109, processed the received system data, and causes the received system data to be stored in the central data repository 103 in accordance with one or more embodiments. In some embodiments, the network management platform 101 continuously monitors the system data received from the network service provider monitoring system(s) 109 by processing received system data that is stored in the central data repository 103, and reorganizing the received system data, as discussed with respect to one or more embodiments.

In some embodiments, when a user (e.g., a network operator, a network service provider, and/or any personnel that would like to or is responsible to monitor the system) wants to monitor one or more KPIs, create one or more KPIs for monitoring, view stored system data, and/or update or send system data, the network management platform 101 makes it possible for a user to access to the centralized platform via a UE 107. The network management platform 101 determines the identity of the user based on user credentials, access device, or some other suitable manner, and provides a graphical user interface to the user via a UE 107. In some embodiments, the network management platform 101 limits functions available to the user by way of the graphical user interface depending on the type of user (e.g., a regular user may have access to fewer functions than a VIP user which provides essential/important services, or a network administrator that may have access to all functions, etc.).

System 100 makes it possible to gather system data regarding and/or from multiple network service providers, multiple domains, multiple technologies, multiple locations, or a combination thereof. In some embodiments, system 100 makes it possible for stored system data to be accessible by all related parties (e.g., network service providers, network operator, end users, etc.). In some embodiments, system 100 makes it possible for a user to select and configure how the user would like the system data to be processed without requiring the network operator or the network service provider to be involved.

In some embodiments, the system 100 provides a centralized system which allows a user to build KPIs for monitoring and/or build a monitoring profile for monitoring KPI data based on raw data received from the network service provider monitoring systems(s) in a user-specified manner. In some embodiments, the system 100 provides a graphical user interface that enables a user to input specific parameters that define a specific KPI, and to input general parameters that define a generic KPI that can then be mapped to existing KPIs and/or stored system data. The network management platform 101, in some embodiments, causes the user-specified manner to be stored as a KPI monitoring profile in the central data repository 103 or some other suitable memory associated with system 100, based upon which the appropriate data for computing the target KPI is to be retrieved by the network management platform 101 from the central data repository 103 and/or from the network service provider monitoring system(s) 109.

In some embodiments, system 100 provides a graphical user interface that enables a user to input/select parameters to specify intended KPI data that the user would like to use for monitoring one or more KPIs. Subsequently, the user-specified parameters are stored as a KPI monitoring profile and, as discussed above, the network monitoring platform will retrieve the data specified by the user from the raw data stored in the central data repository 103, and compute a target KPI value based on the KPI monitoring profile. In some embodiments, the system 100 facilitates a user's ability to standardize KPI data in the user's preferred manner, while ensuring flexibility for other users to configure KPI data in their own preferred manner. For example, in some embodiments, standardization of KPI data for one user is siloed by the network management platform 101 and stored in the central data repository 103 or other suitable memory such that another user may freely configure his own standardized/preferred manner for monitoring KPI data.

In some embodiments, the network management platform 101 processes raw data received from the network management platforms 109, whether that raw data is received directly by the network management platform 101, retrieved by the network management platform 101, and/or discovered in the central data repository 103 by the network management platform 101, to identify information included in the raw data that is usable for monitoring of the communication network 111.

In some embodiments, network management platform 101 is configured to process raw data received from one or more of the network service provider monitoring systems 109 to determine one or more pieces of information included in the raw data are relevant to performance monitoring of the communication network 111 based on a matching with one or more recognized data categories for classifying pieces of information that are relevant to performance monitoring of the communication network 111. Network management platform 101 is also configured to determine whether any pieces of the information included in the raw data are irrelevant to performance monitoring of the communication network based on a failure to match any of the one or more recognized data categories.

In some embodiments, the relevant pieces of information included in the raw data are capable of being classified according to categories including domain, node, network service provider name, technology, counter category, KPI group, or some other suitable category for classifying data for storage in the central data repository 103 and/or retrieval by the network management platform 101.

In some embodiments, upon receipt of the raw data, the network management platform 101 is configured to determine which pieces of information included in the raw data are related to a counter of a particular network element associated with implementing the communication network 111, and then will extract the relevant pieces of information from the raw data for further processing.

In some embodiments, the network management platform 101 is configured to split and label the extracted relevant pieces of information included in the raw data according to the recognized category such as domain, node, network service provider name, technology, counter category, KPI group, etc., and to cause the irrelevant pieces of information (e.g., the pieces of information that are not relevant for monitoring the communication network 111), to be separated from the relevant pieces of information included in the raw data. The network management platform 101 then causes the relevant pieces of information, based upon which KPI data such as various performance metrics may calculated, to be classified in accordance with the recognized categories and stored in the central data repository 103. Such categorization enables the raw data to be stored more systematically and improve the efficiency for the network management platform 101 to retrieve specific data for processing.

In some embodiments, the network management platform 101 deletes the irrelevant pieces of information from the central data repository 103. In some embodiments, the network management platform 101 causes the irrelevant pieces of information to be stored in the central data repository 103 for future potential processing that could, for example, involve the network management platform 101 being updated to recognize new categories, or for the network management platform 101 to assess the completeness of the system data received from the network service provider monitoring systems 109, and/or for some other suitable purpose. In some embodiments, the network management platform 101 is configured to retrieve/request only user-specified pieces of information and/or relevant pieces of information from the network service provider monitoring systems 109.

The system 100, accordingly, makes it possible for the network operator to provide access for a user to access the network management platform 101 and/or the central data repository 103 to view available system data that is capable of being queried, sorted, viewed and used for monitoring one or more KPIs, while also enabling the network service providers to provide raw data to the network operator without any particular formatting or processes for requesting user-specific formatting, while helping users to save time and monitor custom KPIs that are user-specific. This significantly increases the efficiency in KPI data processing, reduces the burden of all parties, and simplifies simultaneous monitoring of different KPIs regarding services provided by different network service providers by individual or different users in each user's own way.

In use, when a user wants to monitor KPIs, create KPI monitoring profile(s), and/or cause the network management platform 101 to retrieve stored data from the central data repository 103, the user accesses the network management platform 101 and/or the central data repository 103 by way of a user terminal (e.g., a UE 107 having connectivity to the communication network 111).

After authentication and authorization based on receiving and processing user credentials (e.g., user ID, password, access device, etc.) received by way of a graphical user interface accessed by way of the UE 107, the network management platform 101 retrieves a user profile (e.g., which may be stored in the central data repository 103 or some other suitable memory or database having connectivity to system 100), accesses the central data repository 103 to determine (based on the user profile) which stored system data is related to user, and then generates and presents a list of the stored system data by way of the graphical user interface based on the determined stored system data related to the user. The list of the stored data is arranged such that the stored data is displayed according to details comprising one or more of the recognized categories.

In some embodiments, if a user wants to create a KPI monitoring profile, the graphical user interface includes an option to receive a user input to create a KPI monitoring profile based on the stored data and a plurality of parameters received by way of a configuration profile user interface. The network management platform 101 then causes the user-created KPI monitoring profile to be stored in the central data repository 103 and identified as corresponding to the user profile.

According to various embodiments, the network management platform 101 then processes the stored system data based on the KPI monitoring profile to generate an output indicative of a performance metric for performance monitoring of the communication network 111, and causes the output indicative of the performance metric to be output to a display of UE 107. In some embodiments, the network management platform 101 causes the performance metric to be calculated on-demand. In some embodiments, the network management platform 101 causes the performance metric to be calculated based on a predefined schedule identified in the configuration profile user interface.

FIG. 2 is a diagram of a graphical user interface 200, in accordance with one or more embodiments. Network management platform 101 is configured to cause graphical user interface 200 to be output to a display.

Graphical user interface 200 is a list of KPI monitoring profiles that are associated with a user profile corresponding to a user that has logged-in to the interface provided by network management platform 101 by way of, for example, a UE 107. Based on the user's log-in credentials, the network management platform 101 gathers information of all the KPI monitoring profiles previously created by the user or associated to the user, retrieves the stored system data associated with the KPI monitoring profiles from the central data storage 103, and processes the retrieved system data based on the gathered KPI monitoring profiles to generate KPI values, generate a list that contains the KPI monitoring profiles and KPI values generated based thereon, and present the list to the user by way of graphical user interface 200.

In this example, list included in graphical user interface 200 includes information corresponding to computation type (e.g., regular, on-demand, etc.), KPI name (e.g., KPI A, etc.), domain (e.g. RAN, CORE, Domain A, etc.), network service provider (e.g., vendor A), node, technology (e.g., LTE, 5G, Technology A, etc.), KPI group (e.g., group A, availability, up-time, etc.), status (e.g., in process, scheduled, available, etc.), and creation date. In some embodiments, additional information is optionally included, lesser information is optionally included, or combinations thereof is included.

The list of KPI monitoring profiles in graphical user interface 200 is a customizable list that enables a user to one or more of add or remove columns from the list, sort based on list headers, filter, scroll right, scroll left, scroll up, scroll down, etc. For example, the user can click on the "domain" tab in graphical user interface 200, and the network management platform 101 will re-arrange the list such that the KPIs are presented sequentially based on the domain type (e.g., based on a user preference, the graphical user interface may arrange all the KPIs of the RAN domain first, followed by KPIs of the Core domain, etc.). In some embodiments, graphical user interface 200 facilitates filtering the KPIs by selecting the desired KPIs from a drop-down list, by selecting the specific parameters from a filter element, etc., such that only KPIs of a user's interest are shown in the list. Graphical user interface 200 includes a "download" button that, if selected by a user, causes network management platform 101 to generate one or more data files comprising the stored data associated with the selected KPI(s) and transfer the generated file(s) to the UE 107 of the user, or to some other suitable location. In some embodiments, the graphical user interface 200 facilitates deleting one or more selected KPIs from the list by providing a trash bin icon, or some other suitable user interface widget for deleting a selected item from the list.

Graphical user interface 200 includes an option to add a new KPI monitoring profile by selecting the plus sign "+" or some other suitable user interface widget.

One option is to create a specific KPI, and another option is to create a generic KPI. When adding a specific KPI, the user makes a selection to create a specific KPI and then hits the plus sign "+" to trigger a configuration interface for creating the specific KPI. When adding a generic KPI, the user makes an alternative selection to create a generic KPI and then hits the plus sign "+" to trigger a configuration interface for creating the generic KPI.

If a specific KPI is to be added, graphical user interface 300 (see FIG. 3) is triggered, which facilitates selecting specific details regarding a target KPI. If a generic KPI is to be added, graphical user interface 600 (see FIG. 6) is triggered, which facilitates selecting fewer details regarding the target KPI.

FIG. 3 is a diagram of a graphical user interface 300, in accordance with one or more embodiments. Network management platform 101 is configured to cause graphical user interface 300 to be output to a display.

Graphical user interface 300 is a KPI configuration interface by which a specific KPI is created.

Graphical user interface 300 includes input fields 301$a$-301$s$ (collectively referred to as "input field 301") configured to receive user inputs for parameters defining the KPI monitoring profile being created. Input fields 301$a$-301$s$ include inputs for receiving KPI name, computation type, domain, node, network service provider name, technology, software version, counter category, type, optional sub-categories, unit, KPI group, interface name, or some other suitable details.

For example, interface name input field 301$q$ is configured to receive a user input specifying an interface name of a selected node for building/monitoring a KPI at an interface level. A node (e.g., router, switch, etc.) may include multiple interfaces, each of which has a KPI which may be built and/or monitored. As such, the interface name input field 301$q$ is configured to receipt a user input specifying the name of the interface of a node for which a KPI is to be built and/or monitored. In some embodiments, after selecting/specifying a parameter in node input field 301$d$, the network management platform 101 causes the name of interfaces associated with the selected node to be made available for selection via input field 301$q$ (e.g., in the form of drop-down list, or some other suitable manner), to facilitate selection of the interface name. In some embodiments, selection/specifying of the interface name via input field 301$q$ is optional (e.g., a node may be selected via input field 301$d$ without selecting anything in input field 301$q$). In such a case, the KPI generated therefrom will be on the node level instead of interface level.

In some embodiments, a quantity of the input fields 301 less than a total quantity of the input fields 301 are required by network management platform 101 for creating a new KPI monitoring profile. In this example, input fields 301$a$-301$i$ and 301$p$ are required by the network management platform 101 before proceeding to a next step in creating the new KPI monitoring profile, as indicated by the solid lines surrounding each input field. In some embodiments, other indicators such as stars, colored field, or other suitable distinguisher may be used. The other input fields 301$j$-301$o$ and 301$q$-301$s$ are optional input fields, as indicated by the dashed lines surrounding the optional input fields. In some embodiments, the optional input fields may be identified by color, grayed out, lack of a star versus having a star in the required input fields, or by some other suitable distinguisher.

In some embodiments, some of the optional input fields are caused to appear or be capable of receiving a user input based on another input field being populated with a user input. For example, if the computation type indicated by a user input received by way of input field 301$i$ is "on the fly", "on-demand," or some other suitable option for indicating the user wants to calculate a KPI value based on historical system data and/or most recent system data, rather than scheduled for a future time, date, and/or periodicity, historical data date range input field 301s is caused to be unlocked, displayed, or otherwise made available for receiving a user input. In some embodiments, entry of a historical data date range is required if the computation type is on the fly, on-demand, etc. In some embodiments, entry of a historical data date range is optional if the computation type is on the fly, on-demand, etc. If optional, and a historical data date range is not provided by the user, the network management platform 101 either uses all of the historical system data corresponding to the target KPI being created to calculate historical KPI values, or the network management platform 101 uses most recent system data to calculate the KPI value. In some embodiments, to enter the historical data date range, historical data date range input field is configured to receive a starting date and ending date for which historical stored data is to be used for calculating KPI values. In some embodiments, historical data date range input field 301s facilitates entry of a duration, includes a drop-down list to allow the user to select an available duration, or some other suitable option which allows the user to specify a range of the historical stored data that should be used for calculating KPIs on the fly, on-demand, etc. In some embodiments to enter a historical data date range, the historical data date range input field 301s includes a check box that is optionally checked for entry of a date/duration range, and unchecked if no date/duration range is to be entered. Though discussed and illustrated as a date range, historical data date range input field, in some embodiments, is configured to receive a user input indicating a duration based on any unit of time, time of day, months, years, hours, minutes, seconds, milliseconds, etc. indicating a start time, and end time, an amount of time, etc.

When the network management platform 101 determines that the user has input/selected all the parameters for selecting node and counter category to create a KPI management profile, the "next" button, a save button, or other suitable functional element will be unlocked to allow the user to proceed to the next step in creating the specific KPI.

Generally, to add a specific KPI, the network management platform 101 processes inputs received by way of graphical user interface 300 selecting node and counter details/categories. Then, the network management platform 101 processes optional user inputs for node and/or time aggregations and/or formula(s) for calculating KPI values associated with the KPI monitoring profile that is being created. In some embodiments, the optional user inputs for node and/or time aggregations and/or formula(s) are received via optional input fields included in graphical user interface 300. In some embodiments, optional user inputs for node and/or time aggregations and/or formula(s) that are included in other graphical user interfaces such as graphical user interface 400 (see FIG. 4) and/or graphical user interface 500 (see FIG. 5). The specified parameters are then stored as a KPI monitoring profile, and the network management platform 101 obtains the relevant system data from the central data repository 103 based on the created KPI monitoring profile in accordance with the computation type, timing/duration, and other parameters specified by the user.

Initially, before the user input/selects any parameter, all system data stored in the central data repository 103 could be the potential data required for generating KPI value(s) corresponding to the created KPI monitoring profile. The initial search scope for potential parameters to be input/selected via the input fields 301 is very wide.

In some embodiments, network management platform 101 is configured to cause the parameters available to be input and/or selected in the input fields 301 to be reduced as other parameters are input/selected by way of other input fields 301 and processed by network management platform 101. By specifying the KPI parameters, the network management platform 101 causes the non-associated available options for input/selection by way of the input fields 301 to be excluded gradually from the search scope and the search scope will be reduced accordingly. The search scope for the KPI monitoring profile set based on the user inputs will ultimately be defined by the user's selected parameters. The more specific the user's defined parameters for the target KPI data, the lesser number, but more specific, system data will be searched and obtained from the central data repository 103 when calculating the KPI value(s). On the other hand, if the user only has a few requirements, and input a few of the parameters, while leaving many of the input fields empty or having a default value, the target KPI will be less specific and the network management platform 101 will then search for an obtain a greater quantity of system data from the central data repository 103.

Some example occurrences caused by the network management platform 101 based on the user inputs received via the input fields 301 are discussed below. In some embodiments, the user selected/input parameters are processed to specify a node and counter category associated with the KPI monitoring profile being created.

KPI name input field 301a is configured to receive a user input indicating a desired KPI name for the KPI monitoring profile being created. The user can give any name for the KPI monitoring profile, or instead proceed with a default system name generated by network management platform 101. After the user has input a word into input field 301a or opted to proceed with a default KPI name in input field 301a, the network management platform 101 scans through the central data repository 103 or other storage for pre-existing KPI monitoring profiles to determine whether or not the same KPI name already exists. If the KPI name already exists, the network management platform 101 generates and causes an error message to be displayed indicating that the same KPI name is already being used to the user via graphical user interface 300. Such a feature helps a user to save time when creating a KPI monitoring profile (e.g., in case the user forgot that a KPI monitoring profile having the same name has been created), and to avoid a duplicate version of the KPI monitoring profile from being created (which wastes network resources and causes confusion in KPI monitoring).

Computation type input field 301b is configured to receive a user input indicating a desired computation type for the KPI monitoring profile being created. The computation type defines when the computation of the KPI value(s) to be determined based on the KPI monitoring profile should start, regular at a predefined schedule and/or a future start date/time, or on the fly/on-demand, or any other suitable computation type.

For example, based on the user inputs, the network management platform 101 obtains updated system data on a regular basis (e.g., every minute, every 15 minutes, etc.), wherein the network service provider monitoring system(s) 109 provide raw data to the central data repository 103, automatically, on-demand, based on a request from the network management platform 101, on a regular basis, etc. Thus, in some embodiments, when a user selects "regular" as the computation type, the network management platform 101 starts obtaining system data from the central data repository 103 in a next cycle and then presents the KPI values according to the KPI monitoring profile to the user. In some embodiments, if the user selects "on-the-fly" or "on-demand" as the computation type, the network management platform 101 will immediately contact the central data repository 103 to retrieve the system data once the KPI monitoring profile is created.

Domain input field 301c is configured to receive a user input indicating a domain (e.g., RAN, Core, etc.) of the KPI monitoring profile being created. Upon receipt of the user input, the network management platform 101 determines which system data in the central data repository 103 is associated with the selected domain, and then reduces the search scope to exclude the non-associated data available for input/selection in other input fields 301.

Node input field 301d is configured to receive a user input indicating a node (e.g., cell, Macro-cell, etc.) of the KPI monitoring profile being created. In some embodiments, the user may select the node from a drop-down list that comprises options of available nodes (which is determined based on the reduced search scope caused by entry(ies) received via other input fields 301). Upon receipt of the user input for the node, network management platform 101 determines which system data in the central data repository 103 is associated with the selected node, and then reduces the search scope to exclude the non-associated data available for input/selection in other input fields 301. In some embodiments, the reduction in search scope is compounded as multiple input fields 301 are populated, in any order, such that a selection in one input field 301 affects the available options in another input field 301, making user interface 300 a multi-dimensional drill-down menu.

Network service provider input field 301e is configured to receive a user input indicating a network service provider name. In some embodiments, the user may select the network service provider name from a drop-down list that comprises options of available network service providers, which may be reduced from a maximum number of available network service providers based on the reduced search scope as one or more other input fields 301 are populated. Upon receipt of the user input, the network management platform 101 determines which system data in the central data repository 103 is associated with the selected network service provider name, and then reduces the search scope to exclude the non-associated data available for input/selection in other input fields 301. In some embodiments, the reduction in search scope is compounded as multiple input fields 301 are populated, in any order, such that a selection in one input field 301 affects the available options in another input field 301, making user interface 300 a multi-dimensional drill-down menu.

Technology input field 301f is configured to receive a user input indicating a technology. In some embodiments, the user may select the technology from a drop-down list that comprises options of available technologies which may be reduced from a maximum number of available technologies based on the reduced search scope as one or more other input fields 301 are populated. Upon receipt of the user's input, the network management platform 101 determines which system data in the central data repository is associated with the selected technology, and then reduces the search scope to exclude the non-associated data available for input/selection in other input fields 301. In some embodiments, the reduction in search scope is compounded as multiple input fields 301 are populated, in any order, such that a selection in one input field 301 affects the available options in another input field 301, making user interface 300 a multi-dimensional drill-down menu.

In some embodiments, based on the reduced search scope, if the network management platform 101 determines that the remaining system data within the search scope includes multiple software versions, the network management platform 101 updates graphical user interface 300 to unlock software version input field 301g for selecting the software version for inclusion in the KPI monitoring profile. Otherwise, if the network management platform 101 determines multiple software versions do not exist, the network management platform 101 causes software input field 301g to be locked, to disappear, be grayed out, or otherwise not be available to the user for receiving a user input indicating the software version.

Counter category input field 301h is configured to receive a user input indicating a counter category. In some embodiments, the user may select the counter category from a drop-down list that comprises options of available counter categories which may be reduced from a maximum number of available counter categories based on the reduced search scope as one or more other input fields 301 are populated. Upon receipt of the user input, the network management platform 101 determines which system data in the central data repository is associated with the selected counter category, and then reduces the search scope to exclude the non-associated data available for input/selection in other input fields 301. In some embodiments, the reduction in search scope is compounded as multiple input fields 301 are populated, in any order, such that a selection in one input field 301 affects the available options in another input field 301, making user interface 300 a multi-dimensional drill-down menu.

Type input field 301j is configured to receive a user input indicating a type of the KPI that is to be tracked according to the KPI monitoring profile. In some embodiments, the user may select the type of the KPI from a drop-down list that comprises options of available types of KPIs which may be reduced from a maximum number of available types of KPIs based on the reduced search scope as one or more other input fields 301 are populated. Upon receipt of the user input, the network management platform 101 determines which data in the central data repository 103 is associated with the selected type, and then reduces the search scope to exclude the non-associated data available for input/selection in other input fields 301. In some embodiments, the reduction in search scope is compounded as multiple input fields 301 are populated, in any order, such that a selection in one input field 301 affects the available options in another input field 301, making user interface 300 a multi-dimensional drill-down menu.

In some embodiments, the type defines the level of the to-be computed KPI value(s). For example, in some embodiments, when "default" is selected as the type, the to-be computed KPI value(s) will be device level KPI(s), and the network management platform 101 causes input fields for specifying aggregation parameters to be provided by way of the graphical user interface, when "management object (MO)" is selected as the type, the to-be computed KPI value(s) will be interface level KPI(s), and the network management platform 101 does not cause input fields for specifying aggregation parameters to be provided by way of the graphical user interface.

Based on the reduced search scope according to the inputs received by way of one or more of the input fields 301, if the network management platform 101 determines the remaining data within the search scope includes one or more sub-categories, the network management platform 101 causes the graphical user interface 300 to unlock, present, or otherwise make available one or more of sub-category input fields 301j-301n for receiving a user input indicating one or more sub-categories. If the network management platform 101 determines that the parameters input thus far do not result in a situation in which one or more sub-categories are available to further define one or more parameters included in the KPI monitoring profile being created, the network management platform 101 causes one or more of the sub-category input fields 301j-301n to not be available to the user for receiving a user input.

Optional unit input field 301o is configured to receive a user input indicating how many units of KPI values the KPI monitoring profile should calculate (e.g., 1, 2, 10, 50, etc.). In some embodiments, if unit input field 301o is not populated based on a received user input, network management platform 101 is configured to calculate a default value of units of KPI values (e.g., 1, 2, 15, 20, etc.). In some embodiments, the default value of units of KPI values is based on one or more of the KPI type, the computation type, the amount of available system data, and/or any other user inputs received by the other input fields 301.

KPI group input field 301 is configured to receive a user input indicating a KPI group. The user may select the KPI group from a drop-down list that comprises options of available KPI groups which may be reduced from a maximum number of available KPI groups based on the reduced search scope as one or more other input fields 301 are populated. Upon receipt of the user input, the network management platform 101 determines which data in the center data storage is associated with the selected KPI group, and then reduces the search scope to exclude the non-associated data available for input/selection in other input fields 301. In some embodiments, the reduction in search scope is compounded as multiple input fields 301 are populated, in any order, such that a selection in one input field 301 affects the available options in another input field 301, making user interface 300 a multi-dimensional drill-down menu.

Optional description input field 301r is configured to receive a user input indicating an optional description of the KPI monitoring profile. In some embodiments, if input field 301r is included in graphical user interface 300 and left unpopulated, network management platform 101 causes a description of the KPI monitoring profile to be a generated message based on the user inputs received by way of one or more of the other input fields 301. In some embodiments, if input field 301r is included in graphical user interface 300 and left unpopulated, network management platform 101 causes a description of the KPI monitoring profile to be a default message.

As discussed above, after entering at least the minimum parameters required for creating the KPI monitoring profile in graphical user interface 300 (which may change as one or more input fields 301 are populated), the user may trigger a next step in the process of generating the specific KPI by hitting the "next" button, save button, or other suitable functional element in graphical user interface 300.

Figure 4:
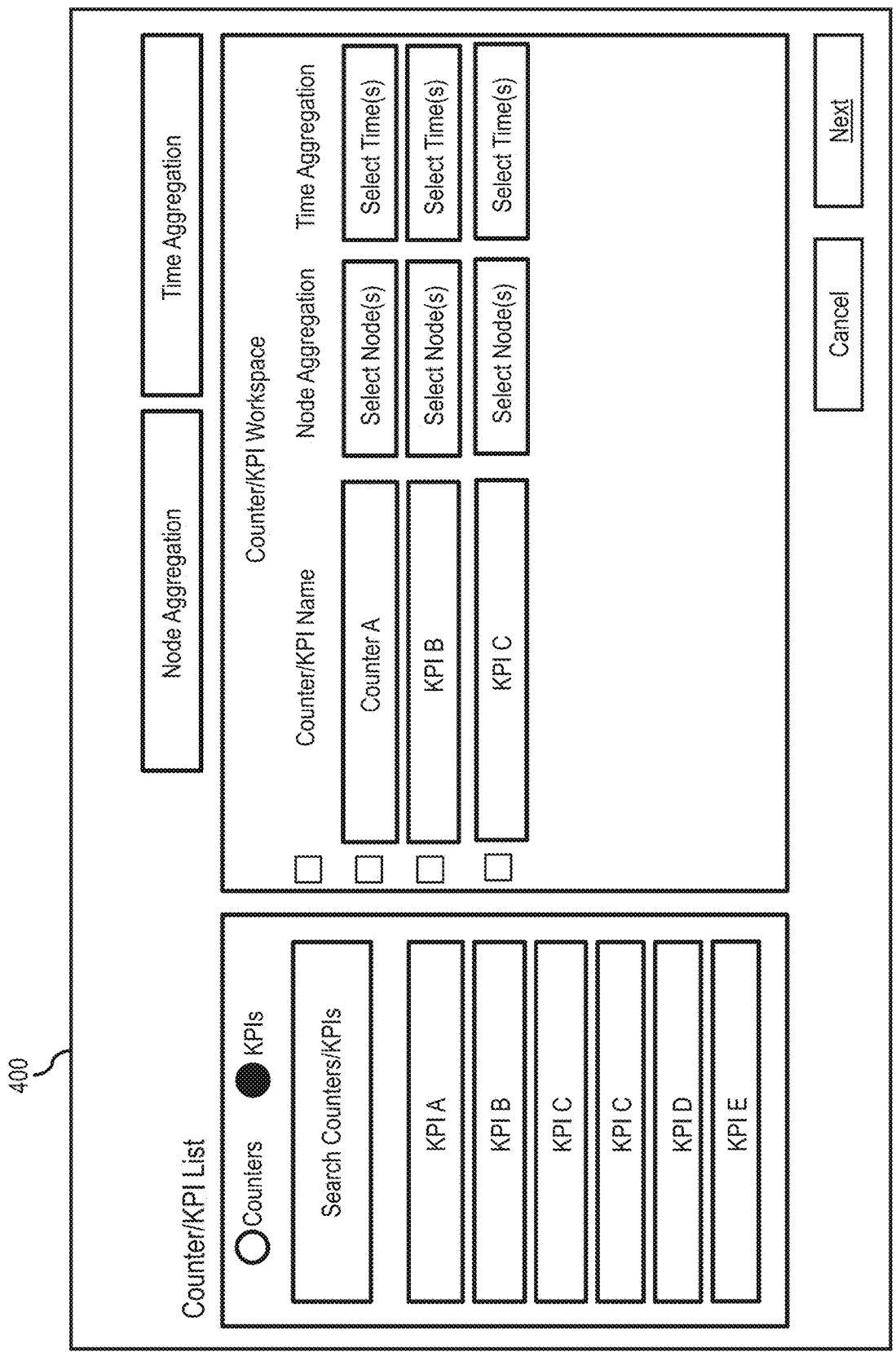
FIG. 4 is a diagram of a graphical user interface, in accordance with one or more embodiments.

FIG. 4 is a diagram of a graphical user interface 400, in accordance with one or more embodiments. Network management platform 101 is configured to cause graphical user interface 400 to be output to a display.

Graphical user interface 400 is a KPI configuration interface by which a specific KPI is created. Upon receipt of the user input to proceed to the next step in graphical user interface 300, the network management platform 101 determines one or more counters and/or existing KPIs associated with the user input/selected parameters in graphical user interface 300, retrieves the related data from the central data repository 103 or other storage, and causes a list of the counters and/or existing KPIs to be added to a counter/KPI list included in graphical user interface 400.

In some embodiments, the user may search through the list of available counters and/or KPIs by way of a word search, filter, scrolling, etc. Graphical user interface 400 also includes counter/KPI workspace field into which one or more selected counters and/or KPIs may be added by, for example, drag-and-drop, clicking a check box, double clicking, etc., of one or more available counters and/or one or more existing KPIs.

Graphical user interface 400 includes node aggregation input field and a time aggregation input field. The node aggregation input field is configured to receive a user input indicating a node aggregation type (e.g., minimum, maximum, average, sum, etc.). Time aggregation input field is configured to receive a user input indicating a time aggregation type (e.g., minimum, maximum, average, sum, etc.).

The node and time aggregation type affect how the network management platform 101 is to determine a KPI value for one or more of the selected counters and/or KPIs added to the counter/KPI workspace field. For example, if the user would like to calculate a KPI value for the general availability of a node A, and node A comprises five counters associated with availability (e.g., available time, etc.), an appropriate "node aggregation" type and "time aggregation" type may be "average". The network management platform 101 is then caused to calculate an average of the five counters during the selected time interval based on the user input(s). On the other hand, if the user would like to cause the network management platform 101 to calculate a KPI value of maximum network traffic of node A, and node A comprises five counters associated with network traffic, an appropriate "node aggregation" type and "time aggregation" type may be "maximum". The network management platform 101 is then caused to determine which of the five counters have the maximum value, and to determine which time in the selected time interval has the maximum value, based on the user input(s).

When the network management platform 101 determines that the user has inputted/selected all required parameters into the input fields, a functional element (e.g., a "next" button, etc.) will be unlocked to allow the user to proceed to the next step in the process for creating a specific KPI.

Figure 5:
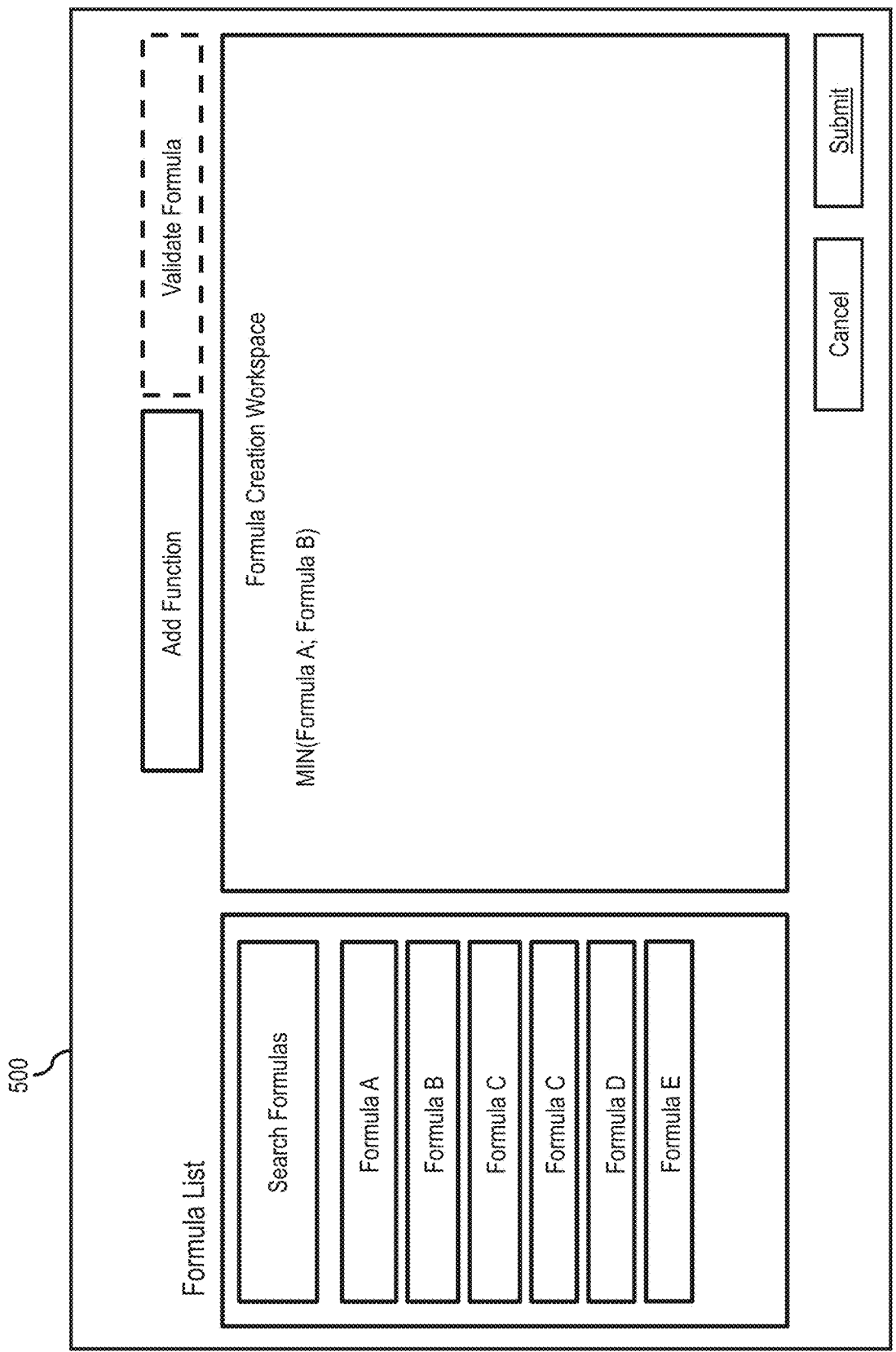
FIG. 5 is a diagram of a graphical user interface, in accordance with one or more embodiments.

FIG. 5 is a diagram of a graphical user interface 500, in accordance with one or more embodiments. Network management platform 101 is configured to cause graphical user interface 500 to be output to a display.

Graphical user interface 500 is displayed based on a user triggering "next" in graphical user interface 400. The network management platform 101, based on the parameters previously received by way of graphical user interface 300 and/or graphical user interface 400, determines one or more formulas related to the target KPI(s) sought to be monitored according to the KPI monitoring profile being created by retrieving the related formula(s) from the stored system data in the central data repository 103 and populates a formula list included in graphical interface 500 containing the related data.

Graphical user interface 500 includes input fields which allow the user to input/select parameters to specify an algorithm to be used in computing the KPI value(s) for the target KPI(s).

Graphical user interface 500 includes a formula search input field that is configured to receive a user input to search for an available formula (which may be determined by the network management platform 101 based on the parameters previously input/selected by the user).

Graphical user interface 500 includes a formula creation workspace which is an input field configured to receive user inputs that include adding one or more formulas from the formula list by an add/drop operation, double clicking, or some other suitable action, user inputs that include a manually created formula using freeform text, an inserted function selected from an add function option box, some other suitable function, or a combination thereof to create an algorithm for calculating the KPI value(s) for the target KPIs. In some embodiments, the add function option box is a drop-down box having preset functions such as "min", "max", "add", "subtract", "multiply', "divide", "average", "sum", "difference", "and", "or", "nand", "nor", "percentage", or some other suitable function usable in a calculation for a KPI value. In some embodiments, network management platform 101 is configured to limit the options available in the add function option box based on the parameters previously input and/or the existing formula(s) and/or the data added to the formula creation workspace.

In some embodiments, graphical user interface 500 comprises a functional element (e.g., a button, etc.) configured to receive a user input to validate the algorithm(s) added to the formula creation workspace. Based on a user input triggering the validate formula functional element, the network management platform 101 validates the algorithm(s) in the formula creation workspace to ensure that the algorithm is capable of being validly applied to the historical values associated with the stored data or future values associated with the stored data. For example, the network management platform 101, based on the user input to validate the algorithm(s), retrieves one or more mathematical rules from the central data repository 103 or other suitable storage, and compares the algorithm(s) with the one or more mathematical rules to ensure that the algorithm(s) complies with the mathematical rules (e.g., network management platform 101 ensures that the algorithm will not be in a form of a value divided by zero, which is a mathematical impossibility, and would result in a computing error, etc.). In some embodiments, the network management platform 101 substitutes the parameters of the algorithm(s) with historical stored data, pre-computes the KPI value(s) using the algorithm(s) based on the historical parameters, and compares the result(s) with one or more threshold values (e.g., if a result is lower than a threshold value, the formula is valid, etc.). In some embodiments, the network management platform 101 performs some other suitable operation to validate the algorithm(s). In some embodiments, the network management platform 101 is configured to recognize the formulas and/or functions included in the algorithm(s) and perform an appropriate operation for validating the algorithm(s) corresponding to those formulas and/or functions recognized.

If the network management platform 101 determines that one or more algorithms in the formula creation workspace are valid, the network management platform 101 causes a "submit" button, or other suitable functional element to be unlocked to enable the user to create the KPI monitoring profile. If the network management platform 101 determines that the algorithm is incapable of being validly applied to the historical values associated with the stored data or future values associated with the stored data, the network management platform 101 prevents submission of the algorithm(s), thereby preventing creation of the KPI monitoring profile. In some embodiments, the step of formula validation is not required, and the network management platform 101 allows a user to submit the parameters for creating the network monitoring profile after selecting/defining the algorithm(s) regardless of whether the algorithm(s) are valid.

Based on the triggering of the submit button, for example, the network management platform 101 creates the KPI monitoring profile according to the user input parameters, updates graphical user interface 200 to include the new KPI monitoring profile in the list of KPI monitoring profiles associated with the user. Subsequently, the network management platform 101 retrieves the corresponding stored data in the central data repository 103 immediately, if on the fly/on-demand is selected as the computation type, or in a next process cycle, if regular is selected as the computation type.

The network management platform 101 processes the stored system data based on the KPI monitoring profile so as to generate the KPI value(s) therefrom. The network management platform 101 stores the KPI values in the central data repository 103 or other suitable storage and causes the KPI values to be viewable by way of the list included in graphical user interface 200, for example, or some other suitable display for viewing and/or comprehension of the metrics indicative of the status of the communication network 111, according to the KPIs being monitored.

Figure 6:
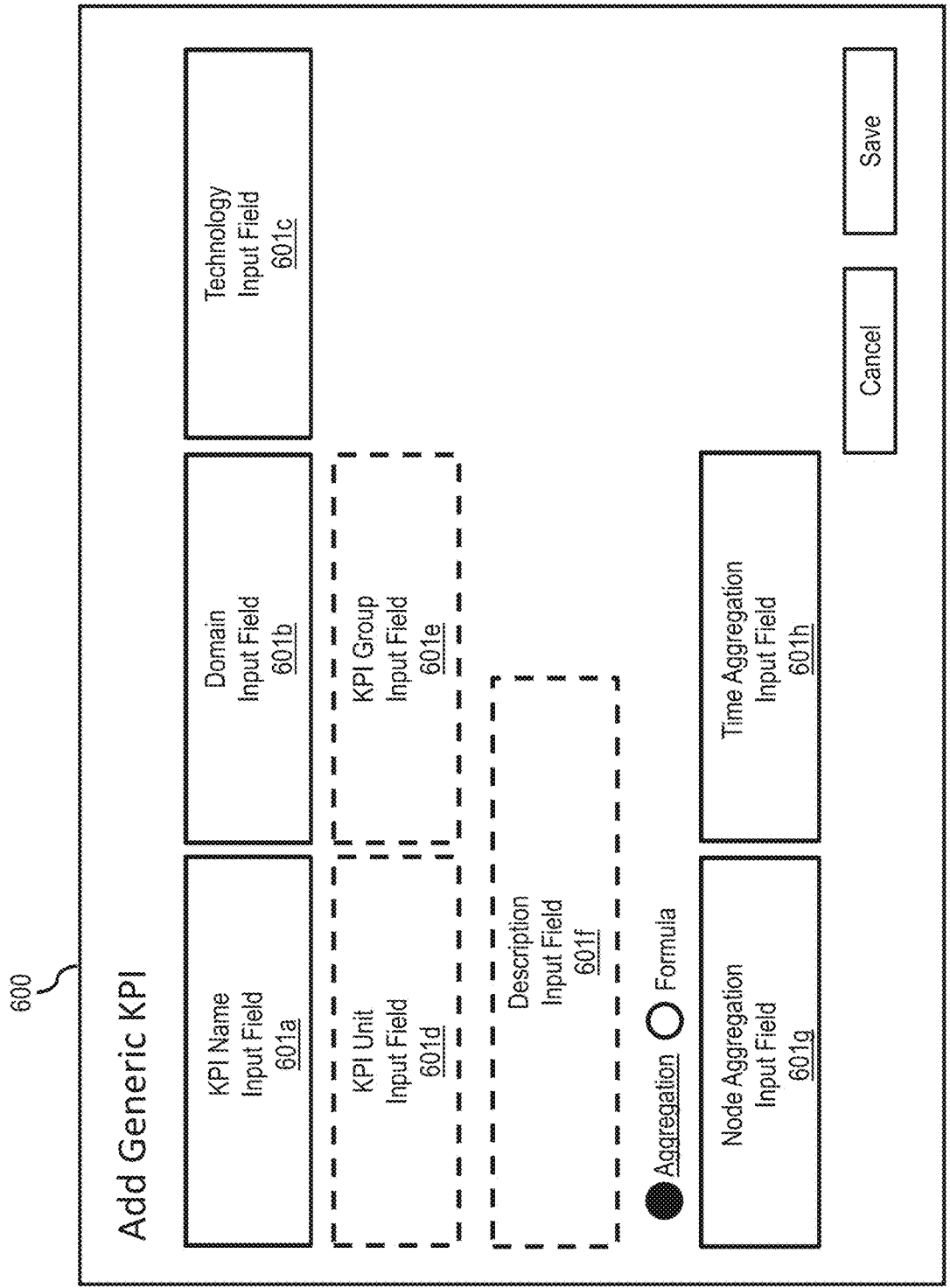
FIG. 6 is a diagram of a graphical user interface, in accordance with one or more embodiments.

FIG. 6 is a diagram of a graphical user interface 600, in accordance with one or more embodiments. Network management platform 101 is configured to cause graphical user interface 600 to be output to a display.

Graphical user interface 600 is displayed based on a user triggering the add generic KPI option and the "+", for example, in graphical user interface 200.

Adding a generic KPI is similar to adding a specific KPI. However, the process of adding a generic KPI enables the user to select/input fewer parameters for specifying the generic KPI as compared to specifying the specific KPI. In some embodiments, adding a generic KPI is a simplified version of the process for adding a specific KPI, with there being fewer steps for adding the generic KPI as compared to adding a specific KPI. When creating a generic KPI, a user will first define the generic KPI, and then map the generic KPI to one or more existing KPIs so as to compute the KPI values for the user's target KPI therefrom.

Graphical user interface 600 includes input fields 601*a*-601*f* configured to receive user inputs for KPI name, domain, technology, KPI unit, KPI group and description. The KPI unit input field 601*d*, the KPI group input field 601*e*, and the description input field 601*g* are optional. Graphical user interface 600 provides options for selecting whether the generic KPI is to be calculated by way of an aggregation method, or by way of a formula method. Graphical user interface 600 is shown having the aggregation option selected. Graphical user interface 700 (see FIG. 7) is shown having the formula option selected.

Because the aggregation option is selected in graphical user interface 600, node aggregation input field 601*g* and time aggregation input field 601*h* are displayed. The user may then input selections for the node aggregation input field 601*g* and/or the time integration input field 601*h*.

Then, based on the user triggering the save button, the generic KPI will be added to the list of KPI monitoring profiles included in graphical user interface 200. In some embodiments, graphical user interface 200 separates specific KPIs and generic KPIs into separate lists. In some embodiments, specific KPIs and generic KPIs are included in a same list. In some embodiments, specific KPIs and generic KPIs have one or more parameters that differ from one another. As such, the specific KPI list and the generic KPI list may have different column headers. But, if the specific KPIs and the generic KPIs are included in one list, then the column headers are uniform, but the content in the rows beneath some column headers may be empty or filled with a default value. For example, if specific KPIs are defined to include a computation type, but generic KPIs do not have a defined computation type, then a column for computation type in a list that includes both specific KPIs and generic KPIs would be left empty for values associated with the generic KPIs.

After adding a KPI profile for a generic KPI to the list of KPIs, the network management platform 101 causes user interface 200 to be displayed for mapping the generic KPI to one or more existing KPIs so as to compute the KPI values for the user's target KPI therefrom. In some embodiments, after adding a KPI profile for a generic KPI to the list of KPIs, the network management platform 101 causes graphical user interface 800 (see FIG. 8) to be displayed for mapping the generic KPI to one or more existing KPIs so as to compute the KPI values for the user's target KPI therefrom.

FIG. 7 is a diagram of a graphical user interface 700, in accordance with one or more embodiments. Network management platform 101 is configured to cause graphical user interface 700 to be output to a display.

Graphical user interface 700 is displayed based on a user selecting the formula option in user interface 600.

Graphical user interface 700 is shown having the same input fields 601a-601f of graphical user interface 600. However, because the formula option is selected, graphical user interface 700 includes a formula list having searchable formulas that are usable for calculating KPI values based on the user inputs received by way of input fields 601a-601f, similar to the formula list discussed above with respect to graphical user interface 500 shown in FIG. 5. Graphical user interface 700 also includes a formula creation workspace for inputting one or more formulas, freeform text, and/or functions added using the add function input field for creating an algorithm usable to calculate the KPI value associated with the generic KPI being created. Graphical user interface 700, similar to graphical user interface 500, optionally includes a validate formula option to determine whether the algorithm is capable of being validly applied to the stored system data and/or is a mathematical impossibility, etc.

Then, based on the user triggering the save button, the generic KPI will be added to the list of KPI monitoring profiles included in graphical user interface 200 and/or the list of generic KPIs included in graphical user interface 800, as discussed above, for mapping the generic KPI to one or more existing KPIs so as to compute the KPI values for the user's target KPI therefrom.

FIG. 8 is a diagram of a graphical user interface 800, in accordance with one or more embodiments. Network management platform 101 is configured to cause graphical user interface 700 to be output to a display.

After adding a KPI profile for a generic KPI to the list of KPIs, the network management platform 101 causes graphical user interface 800 (see FIG. 8) to be displayed. Graphical user interface 800 is shown having one of the KPIs selected, which causes a mapping element 801 that, when selected by a user, causes network management platform 101 to trigger the mapping process of the generic KPI using graphical user interface 900 (see FIG. 9). In some embodiments, the functionalities discussed with respect to graphical user interface 800 are incorporated into graphical user interface 200 if graphical user interface 200 is configured to list both specific KPIs and generic KPIs in a single list. For example, if the saving of the generic KPI being created through graphical user interface 700 is completed, and the KPI list in graphical user interface 200 shows the generic KPI, graphical user interface 200 is caused to include the mapping element 801 to facilitate mapping of the generic KPI, as discussed above. In some embodiments, graphical user interface 800 is viewable by toggling the create generic KPI option in graphical user interface 200 so that a user may view the list of generic KPIs as shown in graphical user interface 800.

FIG. 9 is a diagram of a graphical user interface 900, in accordance with one or more embodiments. Network management platform 101 is configured to cause graphical user interface 900 to be output to a display.

Graphical user interface 900 is caused to be displayed based on a user input indicating that a selected generic KPI is to be mapped. Mapping the selected generic KPI causes the selected KPI to be associated with one or more network service providers, one or more domains, etc.

Graphical user interface 900 includes a map KPI list that comprises the selected generic KPI and any other KPIs that the network management platform 101 determines are related to the selected generic KPI. Graphical user interface 900 also includes a KPI mapping workspace into which selected KPIs from the map KPI list are added by drag/dropping, double clicking, or other suitable method of making a selection using a graphical user interface.

After adding one or more of the KPIs from the map KPI list to the KPI mapping workspace, the network management platform 101 populates the domain, network service provider name, technology and node information based on the user inputs received via graphical user interface 600 or graphical user interface 700, one or more user inputs received in the KPI mapping workspace regarding a selected network element type via the select type input field, and/or stored system data in the central data repository 103. The select type input field is configured to receive a user input indicating a selected type of network element such as gNB, Cell, Macro, DAS, or some other suitable network element detail that the network management platform 101 causes to be included as an available option based on the parameters input by the user thus far and any available stored system data relevant to monitoring the status of the communication network 111 stored in central data repository 103. In some embodiments, a generic KPI may be mapped to multiple domains, network service providers, technologies, nodes, etc. In some embodiments, network management platform 101 is configured to allow one or more of the domain, network service provider, technology or node parameters to be limited to one or some other suitable preset quantity. For example, in some embodiments, the network management platform 101 is configured to prevent the mapping of multiple KPIs from a same network element type into one generic KPI.

After the mapping of the KPI is completed, and the user selected "save", or other suitable option, the network management platform 101 retrieves the appropriate system data from the central data repository 103 and processes the retrieved data to calculate a KPI value based on the generic KPI monitoring profile and the mapping relationship. Subsequently, the network management platform 101 causes the KPI monitoring profile and/or any calculated KPI value(s) to be stored in the central data repository 103, or other suitable storage in a storage to facilitate future presentation of the KPI monitoring profiles and/or KPI value(s) to the user based on a user selection to view one or more selected KPIs in the list of KPIs includes in graphical user interface 200 and/or graphical user interface 800.

Figure 10:
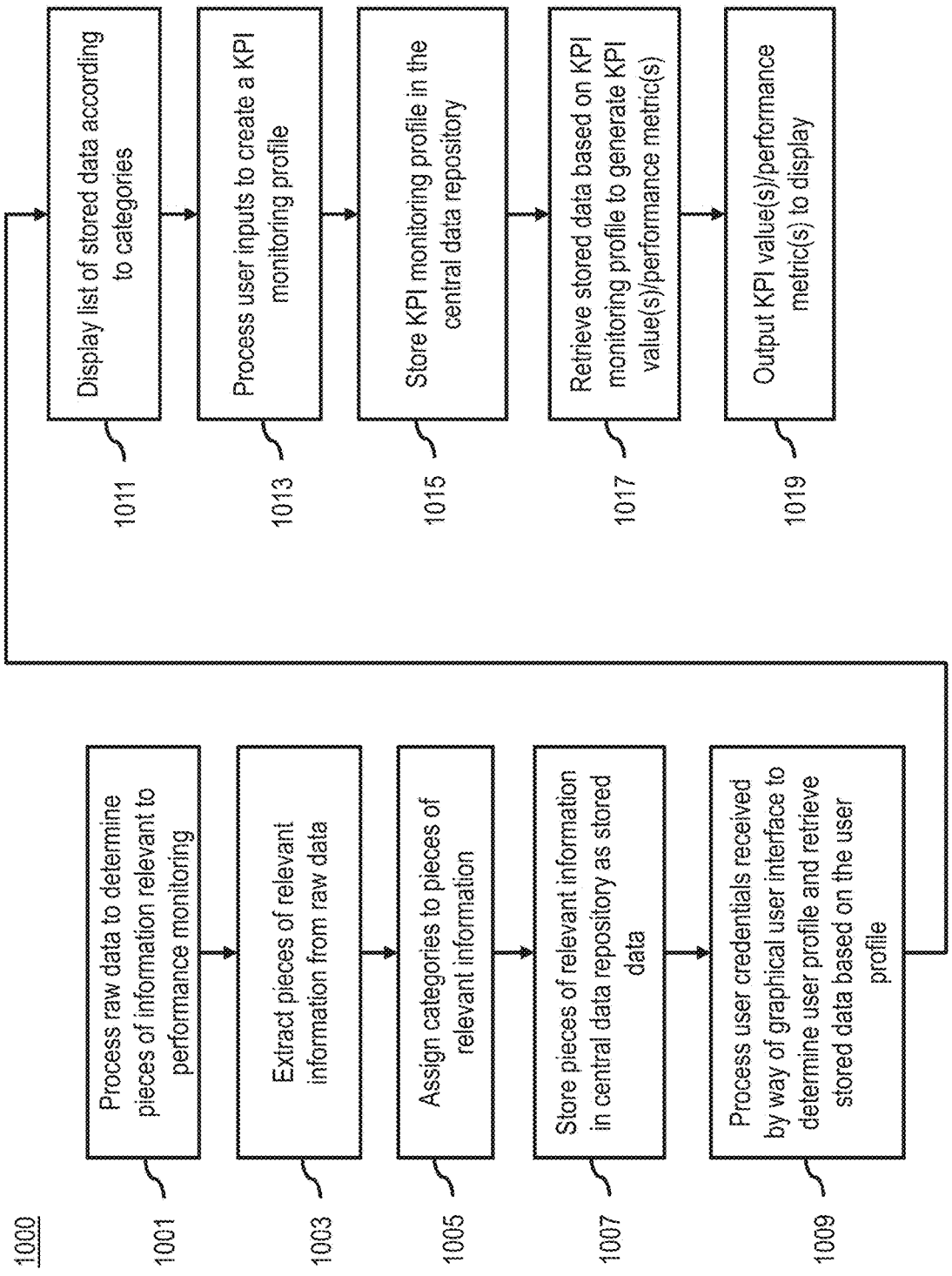
FIG. 10 is a flowchart of a process for storing system data in a central data repository and generating a KPI monitoring profile, in accordance with one or more embodiments.

FIG. 10 is a flowchart of a process 1000 for storing system data in a central data repository and generating a KPI monitoring profile, in accordance with one or more embodiments. In some embodiments, the network management platform 101 (FIG. 1) performs the process 1000. In various embodiments, one or more of the steps of process 1000 can be split into separated processes which are functionally independent from other processes (e.g., process for storing system data in the central data repository, process for generating a KPI monitoring profile, process for outputting KPI value(s) based on the KPI monitoring profile, etc.).

In step 1001, raw data received from a network service provider monitoring system is processed to determine one or more pieces of information included in the raw data are relevant to performance monitoring of a communication network based on a matching with one or more recognized data categories for classifying pieces of information that are relevant to performance monitoring of the communication network, and to determine whether any pieces of the information included in the raw data are irrelevant to performance monitoring of the communication network based on a failure to match any of the one or more recognized data categories.

In step 1003, the one or more pieces of information included in the raw data determined to be relevant to performance monitoring of the communication network are extracted from the raw data.

In step 1005, the one or more recognized data categories matching the one or more pieces of information relevant to performance monitoring of the communication network are assigned to each of the one or more pieces of information relevant to performance monitoring of the communication network.

In step 1007, the one or more pieces of information relevant to performance monitoring of the communication network are caused to be stored in a central data repository as stored data. The one or more pieces of information relevant to performance monitoring of the communication network included in the stored data are classified in the central data repository according to the one or more recognized data categories matching each of the one or more pieces of information relevant to performance monitoring of the communication network.

In step 1009, user credentials received by way of a graphical user interface output by a display are processed, a user profile associated with the user credentials is retrieved from a database, and the central data repository is accessed to retrieve the stored data based on the user profile.

In step 1011, a list of the stored data corresponding to the user profile is caused to be displayed by way of the graphical user interface. The stored data is displayed according to the one or more recognized data categories.

In step 1013, a user input received by way of the graphical user interface is processed to create a key performance indicator (KPI) monitoring profile based on the stored data and a plurality of parameters received by way of a configuration profile user interface.

The configuration profile user interface comprises a plurality of parameter input fields configured to receive information identifying a selected wireless domain of a plurality of wireless domains, a selected network service provider of a plurality of service providers associated with providing a network service to the communication network, a selected network node of a plurality of network nodes, a selected wireless technology of a plurality of wireless technologies associated with the network service, a selected KPI category name, a software version, and/or some other suitable parameter(s).

In some embodiments, when creating the KPI monitoring profile, the information received by way of one or more of the parameter input fields is processed to limit a quantity of options available in other parameter input fields as the information is received by the one or more parameter input fields to those that the apparatus determines are available as corresponding to the information received by the one or more parameter input fields based on the stored data and the one or more data categories of the stored data. In some embodiments, creation of the KPI monitoring profile is restricted until a minimum quantity of the one or more parameter input fields is populated with received information. For example, in some embodiments, the minimum quantity is based on a present number if user input fields of the plurality of parameter input fields. In some embodiments, the minimum quantity is based on the content of the parameter input fields. For example, in some embodiments, the minimum quantity of populated parameter input fields includes at least a selected wireless domain of a plurality of wireless domains, a selected network service provider of a plurality of service providers associated with providing a network service to the communication network, and a selected network node of a plurality of network nodes, or some other suitable combination of parameter(s).

In some embodiments, when creating the KPI monitoring profile, the plurality of parameter input fields are further configured to receive an algorithm for processing one or more of the pieces of information included in the stored data to generate the output indicative of the performance metric for performance monitoring of the communication network. In some embodiments, the algorithm is processed based on one or more historical values associated with the stored data to determine whether the output is capable of being validly applied to the historical values associated with the stored data or future values associated with the stored data. If the algorithm is determined to be capable of being validly applied, the KPI monitoring profile is created, and creation of the KPI monitoring profile is prevented based on a determination that the algorithm is incapable of being validly applied to the historical values associated with the stored data or future values associated with the stored data.

In some embodiments, the configuration profile user interface comprises a plurality of parameter input fields configured to receive information identifying a selected wireless domain of a plurality of wireless domains, a selected technology associated with implementing the communication network, and a KPI group with which the KPI monitoring profile being created is to be associated, and the KPI monitoring profile is generated free from being associated with a named network service provider for all stored data corresponding to the generated KPI monitoring profile. Then, an instruction is processed to map two or more pre-existing KPI monitoring profiles to the generated KPI monitoring profile such that the output of the generated KPI monitoring profile is based on the two or more pre-existing KPI monitoring profiles and the one or more pieces of information relevant to performance monitoring of the communication network received from multiple network service providers.

In step 1015, cause the KPI monitoring profile to be stored in the central data repository and identified as corresponding to the user profile.

In step 1017, the stored data is retrieved based on the KPI monitoring profile to generate and output KPI value(s) indicative of a performance metric for performance monitoring of the communication network. In some embodiments, an aggregated KPI monitoring profile is created that monitors outputs of two or more KPI monitoring profiles configured for monitoring a same aspect of the communication network, and an output of the of the aggregated KPI monitoring profile is generated as a single output based on the outputs of the two or more KPI monitoring profiles. In some embodiments, the single output is an average of the outputs of the two or more KPI monitoring profiles. In some embodiments, the single output is a lowest value output of the two or more KPI monitoring profiles. In some embodiments, the single output is a highest value output of the two or more KPI monitoring profiles.

In step 1019, cause the output indicative of the performance metric to be output to a display.

Figure 11:
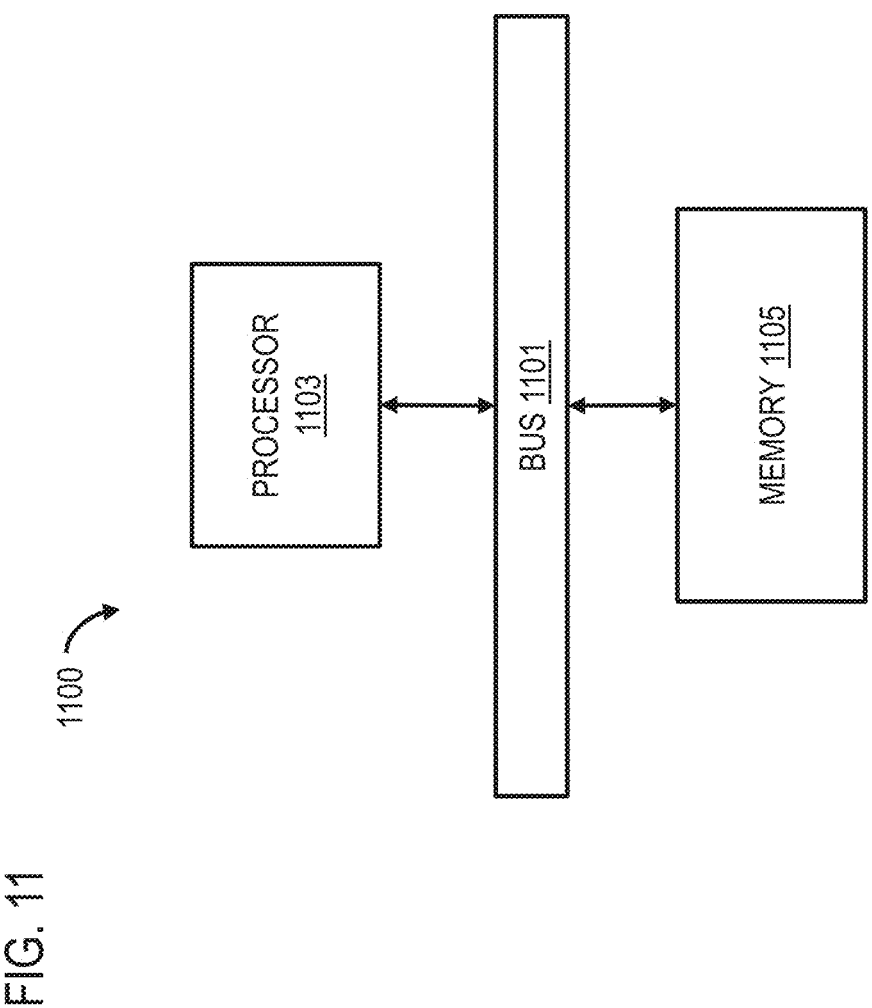
FIG. 11 is a functional block diagram of a computer or processor-based system upon which or by which an embodiment is implemented.

FIG. 11 is a functional block diagram of a computer or processor-based system 1100 upon which or by which an embodiment is implemented.

Processor-based system 1100 is programmed to facilitate storing system data in a central data repository and generating a KPI monitoring profile, as described herein, and includes, for example, bus 1101, processor 1103, and memory 1105 components.

In some embodiments, the processor-based system is implemented as a single "system on a chip." Processor-based system 1100, or a portion thereof, constitutes a mechanism for performing one or more steps of facilitating storing system data in a central data repository and generating a KPI monitoring profile.

In some embodiments, the processor-based system 1100 includes a communication mechanism such as bus 1101 for transferring and/or receiving information and/or instructions among the components of the processor-based system 1100. Processor 1103 is connected to the bus 1101 to obtain instructions for execution and process information stored in, for example, the memory 1105. In some embodiments, the processor 1103 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 1103. Similarly, an ASIC is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 1103 performs a set of operations on information as specified by a set of instructions stored in memory 1105 related to facilitating storing system data in a central data repository and generating a KPI monitoring profile. The execution of the instructions causes the processor to perform specified functions.

The processor 1103 and accompanying components are connected to the memory 1105 via the bus 1101. The memory 1105 includes one or more of dynamic memory (e.g., RAM, magnetic disk, writable optical disk, etc.) and static memory (e.g., ROM, CD-ROM, etc.) for storing executable instructions that when executed perform the steps described herein to facilitate storing system data in a central data repository and generating a KPI monitoring profile. The memory 1105 also stores the data associated with or generated by the execution of the steps.

In one or more embodiments, the memory 1105, such as a random access memory (RAM) or any other dynamic storage device, stores information including processor instructions for storing system data in a central data repository and generating a KPI monitoring profile. Dynamic memory allows information stored therein to be changed. RAM allows a unit of information stored at a location called a memory address to be stored and retrieved independently of information at neighboring addresses. The memory 1105 is also used by the processor 1103 to store temporary values during execution of processor instructions. In various embodiments, the memory 1105 is a read only memory (ROM) or any other static storage device coupled to the bus 1101 for storing static information, including instructions, that is not capable of being changed by processor 1103. Some memory is composed of volatile storage that loses the information stored thereon when power is lost. In some embodiments, the memory 1105 is a non-volatile (persistent) storage device, such as a magnetic disk, optical disk or flash card, for storing information, including instructions, that persists even when the system 1100 is turned off or otherwise loses power.

The term "computer-readable medium" as used herein refers to any medium that participates in providing information to processor 1103, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

An aspect of this description is related to an apparatus comprising a processor and a memory. The memory has instructions stored thereon that, when executed by the processor, cause the apparatus to process raw data received from a network service provider monitoring system to determine one or more pieces of information included in the raw data are relevant to performance monitoring of a communication network based on a matching with one or more recognized data categories for classifying pieces of information that are relevant to performance monitoring of the communication network, and to determine whether any pieces of the information included in the raw data are irrelevant to performance monitoring of the communication network based on a failure to match any of the one or more recognized data categories. The apparatus is also caused to extract the one or more pieces of information included in the raw data determined to be relevant to performance monitoring of the communication network from the raw data. The apparatus is further caused to assign the one or more recognized data categories matching the one or more pieces of information relevant to performance monitoring of the communication network to each of the one or more pieces of information relevant to performance monitoring of the communication network. The apparatus is additionally caused to cause the one or more pieces of information relevant to performance monitoring of the communication network to be stored in a central data repository as stored data. The one or more pieces of information relevant to performance monitoring of the communication network included in the stored data are classified in the central data repository according to the one or more recognized data categories matching each of the one or more pieces of information relevant to performance monitoring of the communication network. The apparatus is also caused to process user credentials received by way of a graphical user interface output by a display, retrieve a user profile associated with the user credentials from a database, and access the central data repository to retrieve the stored data based on the user profile. The apparatus is further caused to cause a list of the stored data corresponding to the user profile to be displayed by way of the graphical user interface, wherein the stored data is displayed according to the one or more recognized data categories. The apparatus is additionally caused to process a user input received by way of the graphical user interface to create a key performance indicator (KPI) monitoring profile based on the stored data and a plurality of parameters received by way of a configuration profile user interface. The apparatus is also caused to cause the KPI monitoring profile to be stored in the central data repository and identified as corresponding to the user profile. The apparatus is further caused to process the stored data based on the KPI monitoring profile to generate an output indicative of a performance metric for performance monitoring of the communication network. The apparatus is additionally caused to cause the output indicative of the performance metric to be output to a display.

Another aspect of this description is related to a method that comprises processing raw data received from a network service provider monitoring system, by a computer system configured to recognize and parse pieces information included in the raw data, to determine one or more pieces of information included in the raw data are relevant to performance monitoring of a communication network based on a matching with one or more recognized data categories for classifying pieces of information that are relevant to performance monitoring of the communication network, and to determine whether any pieces of the information included in the raw data are irrelevant to performance monitoring of the communication network based on a failure to match any of the one or more recognized data categories. The method also comprises extracting the one or more pieces of information included in the raw data determined to be relevant to performance monitoring of the communication network from the raw data. The method further comprises assigning the one or more recognized data categories matching the one or more pieces of information relevant to performance monitoring of the communication network to each of the one or more pieces of information relevant to performance monitoring of the communication network. The method additionally comprises causing the one or more pieces of information relevant to performance monitoring of the communication network to be stored in a central data repository as stored data. The one or more pieces of information relevant to performance monitoring of the communication network included in the stored data are classified in the central data repository according to the one or more recognized data categories matching each of the one or more pieces of information relevant to performance monitoring of the communication network. The method also comprises processing user credentials received by way of a graphical user interface output by a display, retrieve a user profile associated with the user credentials from a database, and access the central data repository to retrieve the stored data based on the user profile. The method further comprises causing a list of the stored data corresponding to the user profile to be displayed by way of the graphical user interface, wherein the stored data is displayed according to the one or more recognized data categories. The method additionally comprises processing a user input received by way of the graphical user interface to create a key performance indicator (KPI) monitoring profile based on the stored data and a plurality of parameters received by way of a configuration profile user interface. The method also comprises causing the KPI monitoring profile to be stored in the central data repository and identified as corresponding to the user profile. The method further comprises processing the stored data based on the KPI monitoring profile to generate an output indicative of a performance metric for performance monitoring of the communication network. The method additionally comprises causing the output indicative of the performance metric to be output to a display.

Another aspect of this description is related to a non-transitory computer readable medium having instructions stored thereon that, when executed by a processor, cause an apparatus to process raw data received from a network service provider monitoring system to determine one or more pieces of information included in the raw data are relevant to performance monitoring of a communication network based on a matching with one or more recognized data categories for classifying pieces of information that are relevant to performance monitoring of the communication network, and to determine whether any pieces of the information included in the raw data are irrelevant to performance monitoring of the communication network based on a failure to match any of the one or more recognized data categories. The apparatus is also caused to extract the one or more pieces of information included in the raw data determined to be relevant to performance monitoring of the communication network from the raw data. The apparatus is further caused to assign the one or more recognized data categories matching the one or more pieces of information relevant to performance monitoring of the communication network to each of the one or more pieces of information relevant to performance monitoring of the communication network. The apparatus is additionally caused to cause the one or more pieces of information relevant to performance monitoring of the communication network to be stored in a central data repository as stored data. The one or more pieces of information relevant to performance monitoring of the communication network included in the stored data are classified in the central data repository according to the one or more recognized data categories matching each of the one or more pieces of information relevant to performance monitoring of the communication network. The apparatus is also caused to process user credentials received by way of a graphical user interface output by a display, retrieve a user profile associated with the user credentials from a database, and access the central data repository to retrieve the stored data based on the user profile. The apparatus is further caused to cause a list of the stored data corresponding to the user profile to be displayed by way of the graphical user interface, wherein the stored data is displayed according to the one or more recognized data categories. The apparatus is additionally caused to process a user input received by way of the graphical user interface to create a key performance indicator (KPI) monitoring profile based on the stored data and a plurality of parameters received by way of a configuration profile user interface. The apparatus is also caused to cause the KPI monitoring profile to be stored in the central data repository and identified as corresponding to the user profile. The apparatus is further caused to process the stored data based on the KPI monitoring profile to generate an output indicative of a performance metric for performance monitoring of the communication network. The apparatus is additionally caused to cause the output indicative of the performance metric to be output to a display.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An apparatus, comprising:
   a processor; and
   a memory having instructions stored thereon that, when executed by the processor, cause the apparatus to:
   process raw data received from a network service provider monitoring system to determine one or more pieces of information included in the raw data are relevant to performance monitoring of a communication network based on a matching with one or more recognized data categories for classifying pieces of information that are relevant to performance monitoring of the communication network, and to determine whether any pieces of the information included in the raw data are irrelevant to performance monitoring of the communication network based on a failure to match any of the one or more recognized data categories;
   extract the one or more pieces of information included in the raw data determined to be relevant to performance monitoring of the communication network from the raw data;
   assign the one or more recognized data categories matching the one or more pieces of information relevant to performance monitoring of the communication network to each of the one or more pieces of information relevant to performance monitoring of the communication network;
   cause the one or more pieces of information relevant to performance monitoring of the communication network to be stored in a central data repository as stored data, wherein the one or more pieces of information relevant to performance monitoring of the communication network included in the stored data are classified in the central data repository according to the one or more recognized data categories matching each of the one or more pieces of information relevant to performance monitoring of the communication network;
   process user credentials received by way of a graphical user interface output by a display, retrieve a user profile associated with the user credentials from a database, and access the central data repository to retrieve the stored data based on the user profile;
   cause a list of the stored data corresponding to the user profile to be displayed by way of the graphical user interface, wherein the stored data is displayed according to the one or more recognized data categories;
   process a user input received by way of the graphical user interface to create a key performance indicator (KPI) monitoring profile based on the stored data and a plurality of parameters received by way of a configuration profile user interface;
   cause the KPI monitoring profile to be stored in the central data repository and identified as corresponding to the user profile;
   process the stored data based on the KPI monitoring profile to generate an output indicative of a performance metric for performance monitoring of the communication network; and
   cause the output indicative of the performance metric to be output to a display.

2. The apparatus of claim 1, wherein the configuration profile user interface comprises a plurality of parameter input fields configured to receive information identifying a selected wireless domain of a plurality of wireless domains, a selected network service provider of a plurality of service providers associated with providing a network service to the communication network, and a selected network node of a plurality of network nodes, and the apparatus is further caused to:
   process the information received by way of one or more of the parameter input fields to limit a quantity of options available in other parameter input fields as the information is received by the one or more parameter input fields to those that the apparatus determines are available as corresponding to the information received by the one or more parameter input fields based on the stored data and the one or more data categories of the stored data.

3. The apparatus of claim 2, wherein the apparatus is configured to restrict creation of the KPI monitoring profile until a minimum quantity of the one or more parameter input fields is populated with received information.

4. The apparatus of claim 2, wherein the plurality of parameter input fields are further configured to receive information identifying a selected wireless technology of a plurality of wireless technologies associated with the network service, a selected KPI category name, and a software version.

5. The apparatus of claim 2, wherein the plurality of parameter input fields are further configured to receive an algorithm for processing one or more of the pieces of information included in the stored data to generate the output indicative of the performance metric for performance monitoring of the communication network.

6. The apparatus of claim 5, wherein the apparatus is further caused to:
   process the algorithm based on one or more historical values associated with the stored data to determine whether the output is capable of being validly applied to the historical values associated with the stored data or future values associated with the stored data; and
   prevent creation of the KPI monitoring profile based on a determination that the algorithm is incapable of being validly applied to the historical values associated with the stored data or future values associated with the stored data.

7. The apparatus of claim 2, wherein the apparatus is further caused to:
   create an aggregated KPI monitoring profile that monitors outputs of two or more KPI monitoring profiles configured for monitoring a same aspect of the communication network; and cause an output of the of the aggregated KPI monitoring profile to be a single output based on the outputs of the two or more KPI monitoring profiles.

8. The apparatus of claim 7, wherein the single output is an average of the outputs of the two or more KPI monitoring profiles.

9. The apparatus of claim 7, wherein the single output is a lowest value output of the two or more KPI monitoring profiles.

10. The apparatus of claim 7, wherein the single output is a highest value output of the two or more KPI monitoring profiles.

11. The apparatus of claim 1, wherein the configuration profile user interface comprises a plurality of parameter input fields configured to receive information identifying a selected wireless domain of a plurality of wireless domains, a selected technology associated with implementing the communication network, and a KPI group with which the KPI monitoring profile being created is to be associated, and the apparatus is further caused to:
generate the KPI monitoring profile free from being associated with a named network service provider for all stored data corresponding to the generated KPI monitoring profile; and
process an instruction to map two or more pre-existing KPI monitoring profiles to the generated KPI monitoring profile such that the output of the generated KPI monitoring profile is based on the two or more pre-existing KPI monitoring profiles and the one or more pieces of information relevant to performance monitoring of the communication network received from multiple network service providers.

12. A method, comprising:
processing raw data received from a network service provider monitoring system, by a computer system configured to recognize and parse pieces information included in the raw data, to determine one or more pieces of information included in the raw data are relevant to performance monitoring of a communication network based on a matching with one or more recognized data categories for classifying pieces of information that are relevant to performance monitoring of the communication network, and to determine whether any pieces of the information included in the raw data are irrelevant to performance monitoring of the communication network based on a failure to match any of the one or more recognized data categories;
extracting the one or more pieces of information included in the raw data determined to be relevant to performance monitoring of the communication network from the raw data;
assigning the one or more recognized data categories matching the one or more pieces of information relevant to performance monitoring of the communication network to each of the one or more pieces of information relevant to performance monitoring of the communication network;
causing the one or more pieces of information relevant to performance monitoring of the communication network to be stored in a central data repository as stored data, wherein the one or more pieces of information relevant to performance monitoring of the communication network included in the stored data are classified in the central data repository according to the one or more recognized data categories matching each of the one or more pieces of information relevant to performance monitoring of the communication network;
processing user credentials received by way of a graphical user interface output by a display, retrieve a user profile associated with the user credentials from a database, and access the central data repository to retrieve the stored data based on the user profile;
causing a list of the stored data corresponding to the user profile to be displayed by way of the graphical user interface, wherein the stored data is displayed according to the one or more recognized data categories;
processing a user input received by way of the graphical user interface to create a key performance indicator (KPI) monitoring profile based on the stored data and a plurality of parameters received by way of a configuration profile user interface;
causing the KPI monitoring profile to be stored in the central data repository and identified as corresponding to the user profile;
processing the stored data based on the KPI monitoring profile to generate an output indicative of a performance metric for performance monitoring of the communication network; and
causing the output indicative of the performance metric to be output to a display.

13. The method of claim 12, wherein the configuration profile user interface comprises a plurality of parameter input fields configured to receive information identifying a selected wireless domain of a plurality of wireless domains, a selected network service provider of a plurality of service providers associated with providing the network service to the communication network, and a selected network node of a plurality of network nodes, and the method further comprises:
processing the information received by way of one or more of the parameter input fields to limit a quantity of options available in other parameter input fields as the information is received by the one or more parameter input fields to those that the apparatus determines are available as corresponding to the information received by the one or more parameter input fields based on the stored data and the one or more data categories of the stored data.

14. The method of claim 13, further comprising:
restricting creation of the KPI monitoring profile until a minimum quantity of the one or more parameter input fields is populated with received information.

15. The method of claim 13, wherein the plurality of parameter input fields are further configured to receive information identifying a selected wireless technology of a plurality of wireless technologies associated with the network service, a selected KPI category name, and a software version.

16. The method of claim 13, wherein the plurality of parameter input fields are further configured to receive an algorithm for processing one or more of the pieces of information included in the stored data to generate the output indicative of the performance metric for performance monitoring of the communication network.

17. The method of claim 13, further comprising:
creating an aggregated KPI monitoring profile that monitors outputs of two or more KPI monitoring profiles configured for monitoring a same aspect of the communication network; and
causing an output of the of the aggregated KPI monitoring profile to be a single output based on the outputs of the two or more KPI monitoring profiles.

18. The method of claim 12, wherein the configuration profile user interface comprises a plurality of parameter input fields configured to receive information identifying a selected wireless domain of a plurality of wireless domains, a selected technology associated with implementing the communication network, and a KPI group with which the KPI monitoring profile being created is to be associated, and the method further comprises:

generating the KPI monitoring profile free from being associated with a named network service provider for all stored data corresponding to the generated KPI monitoring profile; and processing an instruction to map two or more pre-existing KPI monitoring profiles to the generated KPI monitoring profile such that the output of the generated KPI monitoring profile is based on the two or more pre-existing KPI monitoring profiles and the one or more pieces of information relevant to performance monitoring of the communication network received from multiple network service providers.

19. A non-transitory computer readable medium having instructions stored thereon that, when executed by a processor, cause an apparatus to:

process raw data received from a network service provider monitoring system to determine one or more pieces of information included in the raw data are relevant to performance monitoring of a communication network based on a matching with one or more recognized data categories for classifying pieces of information that are relevant to performance monitoring of the communication network, and to determine whether any pieces of the information included in the raw data are irrelevant to performance monitoring of the communication network based on a failure to match any of the one or more recognized data categories;

extract the one or more pieces of information included in the raw data determined to be relevant to performance monitoring of the communication network from the raw data;

assign the one or more recognized data categories matching the one or more pieces of information relevant to performance monitoring of the communication network to each of the one or more pieces of information relevant to performance monitoring of the communication network;

cause the one or more pieces of information relevant to performance monitoring of the communication network to be stored in a central data repository as stored data, wherein the one or more pieces of information relevant to performance monitoring of the communication network included in the stored data are classified in the central data repository according to the one or more recognized data categories matching each of the one or more pieces of information relevant to performance monitoring of the communication network;

process user credentials received by way of a graphical user interface output by a display, retrieve a user profile associated with the user credentials from a database, and access the central data repository to retrieve the stored data based on the user profile;

cause a list of the stored data corresponding to the user profile to be displayed by way of the graphical user interface, wherein the stored data is displayed according to the one or more recognized data categories;

process a user input received by way of the graphical user interface to create a key performance indicator (KPI) monitoring profile based on the stored data and a plurality of parameters received by way of a configuration profile user interface;

cause the KPI monitoring profile to be stored in the central data repository and identified as corresponding to the user profile;

process the stored data based on the KPI monitoring profile to generate an output indicative of a performance metric for performance monitoring of the communication network; and cause the output indicative of the performance metric to be output to a display.

20. The non-transitory computer readable medium of claim 19, wherein the configuration profile user interface comprises a plurality of parameter input fields configured to receive information identifying a selected wireless domain of a plurality of wireless domains, a selected network service provider of a plurality of service providers associated with providing the network service to the communication network, and a selected network node of a plurality of network nodes, and the apparatus is further caused to:

process the information received by way of one or more of the parameter input fields to limit a quantity of options available in other parameter input fields as the information is received by the one or more parameter input fields to those that the apparatus determines are available as corresponding to the information received by the one or more parameter input fields based on the stored data and the one or more data categories of the stored data.

\* \* \* \* \*